(12) United States Patent
Takaragi et al.

(10) Patent No.: US 6,236,729 B1
(45) Date of Patent: May 22, 2001

(54) KEY RECOVERY METHOD AND SYSTEM

(75) Inventors: Kazuo Takaragi, Ebina; Hiroyuki Kurumatani, Yokohama, both of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/092,140

(22) Filed: Jun. 5, 1998

(30) Foreign Application Priority Data

Jun. 6, 1997 (JP) ................................... 9-149424

(51) Int. Cl.$^7$ .................................................. H04L 9/08
(52) U.S. Cl. ........................... 380/286; 380/278; 380/28; 380/21; 713/171
(58) Field of Search ............................................. 380/286

(56) References Cited

PUBLICATIONS

Koyama et. al. Elliptical Curve Cryptosystems and Their Applications, IEICE Trans INF & Syst. E75–D pp. 50–57, Jan. 1992.*
Bruce Schneier, Applied Crytography, 2e, John Wiley pp. 70–73, Oct. 1995.*
IBM SecureWay key recovery technology, http://www.ibm.com/security/html/prkeyrec.html, Jan. 27, 1997.*
IBM Comparison to Alternatives, http://www~4.ibm.com/software/security/keywords/library/whitepapers/keyrec3.html, Jan. 27, 1997.*
SecureWay Key Recovery technology, http://www~4.ibm.com/software/security/keyworks/library/whitepapers/keyrec.html, Jan. 27, 1997.*
IBM SecureWay key recovery technology, http://www~4.ibm.com/software/security/keyworks/library/whitepapers/keyrec2.html, Jan. 27, 1997.*
BIT, Lecture, Feb. 1996, vol. 28, No. 2.
"Fair Cryptosystems" by S. Micali, Aug. 11, 1994.

* cited by examiner

Primary Examiner—Gail Hayes
Assistant Examiner—James Seal
(74) Attorney, Agent, or Firm—Antonelli, Terry, Stout & Kraus, LLP

(57) ABSTRACT

A key recovery method and system capable of key recovery without informing a third party of one's own secret key are disclosed. For realization of the method, a transmitting information processor generates a data value satisfying a relational expression by which if one of data obtained by converting a first public key and used as a cipher text generating parameter and data obtained by converting at least one second public key is decided, the other can be determined. The transmitting processor transmits a cipher text applied with the generated data value to a first receiving information processor which has a secret key paired with the first public key and at least one second receiving information processor which has a secret key paired with the second public key. The first receiving processor, even in the case of loss of the secret key paired with the first public key, can determine the data obtained by converting the first public key in such a manner that data obtained from the second receiving processor by converting the second public key and determined from the secret key paired with the second public key and the data value applied to the cipher text sent from the transmitting processor are introduced into the above relational relationship. Thereby, the cipher text can be deciphered into the original message.

19 Claims, 21 Drawing Sheets

$g(x, a_1, a_2, a_3) \equiv a_1 + a_2 \cdot x + a_3 \cdot x^2 \pmod{n}$ $g(x, a_1, a_2, a_3, a_4) \equiv a_1 + h(a_2) \cdot x + h(a_3) \cdot x^2 + h(a_4) \cdot x^3 \pmod{n}$

KEY RECOVERY METHOD AND SYSTEM

BACKGROUND OF THE INVENTION

The present invention relates to a security security-ensuring technique such as data encipherment in a computer network, and more particularly to a key recovery (or key deposition) method and system.

One technique for ensuring the security of data such as electronic mail communicated through a network includes a data ciphering system, called a public-key cryptographic scheme, in which data is ciphered using numeric data, called a public key, and the ciphered data, is deciphered using numeric data called a secret key, having a numerical value different from that of the public key.

In the public-key cryptographic scheme, however, when a secret key is lost for some reason or other, it becomes virturally impossible to decipher the data which is ciphered by the public key paired with the secret key. For example, where the ciphered data is preserved in a file or the like from which it is later taken out, the restoration of this data is impossible if there is no the secret key. This is equivalent to the loss of data. The loss of a secret key is an untenable situation. Absent measures for the relief of this situation, significant trouble, difficulty or inconvenience may be encountered.

Therefore, a key recovery (or deposition) system has been proposed in which an individual or organization confidential information is backed-up by enabling the decipherment of ciphered data in the case where a secret key has been lost due to a.

In this system, provisions against the case of loss of one's own secret key are made by depositing the secret key in a third party (or key-preserving facility or agent) which performs confidential management. For example, one's own secret key is divisionally deposited in a plurality of key-preserving facilities so that in the case where the secret key has been lost, the secret key can be recovered by performing operational processing, such, as exclusive logical sum, addition or the like, for the divisional key parts deposited in the plurality of key-preserving facilities.

The above-mentioned techniques have been disclosed by, for example, Masahiro Manpo and Eiji Okamoto, "Impacts of Network Cryptograph Clippers", BIT, Vol. 28, No. 2, February 1996, and Silvio Micali, "Fair Cryptosystems", MIT/LCS1TR-579.c, Laboratory for Computer Science, Massachusette Institute of Technology, August 1994.

In the above-described conventional key recovery system, however, a secret key as the one and only means for deciphering data ciphered by one's own public key must be deposited in a third party or key preserving facility other than oneself beforehand. In this case, the secret key must be deposited in the key-preserving facility in such a manner as to ensure the confidentiality. This requires considerable labor, time and/or cost. Particularly, in the case where the secret key is divisionally deposited in a plurality of key-preserving facilities, a considerable burder is imposed on the user.

SUMMARY OF THE INVENTION

An object of the present invention is to provide a key-recovery method and system capable of eliminating labor, time and/or costs in which a cipher text receiver as a user operates using the user's own secret key deposited with a third party such as a key preserving facility. Another object of the present invention is to provide a computer-readable medium in which a program performing such a method is stored. A further object of the present invention is to provide a key-recovery method and system in which the security and reliability of a secret key can be improved by applying threshold logic.

To that end, a first aspect of the present invention provides a key-recovery method in which data obtained by converting a public key and used as a parameter at the time of generation of a cipher text is generated without using a secret key paired with the public key. The method comprises, on the transmitting side, a first processing of generating a data value satisfying a predetermined relational expression by which data obtained by converting a first public key and used as a parameter at the time of generation of a cipher text can be determined directly or indirectly if data obtained by converting at least one second public key is decided between the data obtained by converting the first public key and the data obtained by converting the second public key, a second processing of applying the cipher text with the data value generated in the first processing, and comprising, on the receiving side possessing a secret key paired with the second key, a third processing of determining the data obtained by converting the second public key, the determination being made from the secret key paired with the second key, and a fourth processing of determining the data obtained by converting the first public key and used as the parameter at the time of generation of the cipher text, the determination being made by introducing, the data value applied to the cipher text in the second processing and the data determined in the third processing, into the relational expression used in the first processing.

The data obtained by converting the public key is, for example, data obtained by operating a generated random number and the public key.

In the first aspect of the present invention, the cipher text is applied with the data value satisfying the predetermined relational expression by which the data obtained by converting the first public key and used as the parameter at the time of generation of the cipher text can be determined directly or indirectly if the data obtained by converting the second public key is decided between the data obtained by converting the first public key and the data obtained by converting the second public key.

The data obtained by converting the second public key can be determined from the secret key paired with the second public key.

Therefore, the data obtained by converting the first public key and used as the parameter at the time of generation of the cipher text can be determined by a possessor of the secret key paired with the second public key from the data value satisfying the predetermined relational expression.

Accordingly, it is possible to decipher the cipher text without a secret key paired with the first public key. In other words, even if one's own secret key (or the secret key paired with the first public key) is not deposited in a third party or key preserving facility other than oneself, it becomes possible for a possessor of a secret key paired with the second public key to perform key recovery.

As mentioned earlier, in the conventional key recovery system, one's own secret key must be deposited in a key preserving facility other than oneself. In this case, it is necessary that the secret key should be deposited in the key preserving facility in such a manner that the confidentiality can be ensured. This requires much labor, time and/or cost. Particularly, in the case where the secret key is divisionally deposited in a plurality of key preserving facilities, a considerable burden is imposed on the user.

In the first aspect of the present invention, on the other hand, it is possible to eliminate such a labor, time and/or cost, thereby reducing the burden imposed on the user.

In the first aspect of the present invention, the secret key paired with the second public key may be held by a plurality of information processors in a plurality of parts so that it is resortable through a predetermined operation for those parts. In this case, it is preferable that at least one of the plurality of information processors restores the secret key by performing the predetermined operation for the secret key parts possessed by the plurality of information processors and uses the restored secret key to determine the data obtained by converting the second public key. Thereby, it becomes possible for the receiving side to acquire the data obtained on the transmitting side by converting the second public key.

According to a second aspect of the present invention, there is provided a key recovery method of recovering data used as a parameter at the time of generation of a cipher text. The method comprises, on the transmitting side, a first processing of generating data to be used as a parameter at the time of generation of a cipher text, the data being generated on the basis of data obtained by converting at least one first public key and data obtained by converting at least one second public key, a second processing of using as a parameter the data generated in the first processing to generate the cipher text, a third processing of generating a data value satisfying a relational expression by which if one of the data obtained by converting the at least one first public key and the data obtained by converting the at least one second public key is decided, the other data thereof can be determined directly or indirectly, and a fourth processing of applying, the data value generated in the third processing, to the cipher text generated in the second processing, and comprising, on the receiving side possessing a secret key paired with the second key, a fifth processing of determining the data obtained by converting the at least one second public key, the determination being made from the secret key paired with the second key, a sixth processing of determining the data obtained by converting the at least one first public key, the determination being made by introducing, the data value applied to the cipher text in the fourth processing and the data determined in the fifth processing, into the relational expression used in the third processing, and a seventh processing of determining the data generated in the first processing and used as the parameter at the time of generation of the cipher text, the determination being made on the basis of the data obtained by converting the at least one first public key and determined in the sixth processing and the data obtained by converting the at least one second public key determined in the fifth processing.

The second aspect of the present invention is different from the first aspect in that, in lieu of the data obtained by converting the first public key (in the first aspect), the data generated on the basis of the data obtained by converting the at least one first public key and the data obtained by converting the at least second public key is used as the parameter for generation of the cipher text.

In the second aspect of the present invention, the data obtained by converting the first public key can be determined by a possessor of the secret key paired with the second public key from the data value applied with the cipher text. And, the possessor of the secret key paired with the second public key can determine the data used as the parameter for generation of the cipher text on the basis of the data obtained by converting the first public key and determined from the data value applied to the cipher text and the data obtained by converting the second public key and determined the secret key paired with the second public key.

Accordingly, it is possible to decipher the cipher text without a secret key paired with the first public key, similarly to the first aspect of the present invention. In other words, even if one's own secret key (or the secret key paired with the first public key) is not deposited in a third party or key preserving facility other than oneself, it becomes possible for a possessor of a secret key paired with the second public key to perform key recovery.

As mentioned above, in the second aspect of the present invention, the data generated on the basis of the data obtained by converting the at least one first public key and the data obtained by converting the at least second public key is used, as the parameter for generation of the cipher text, in lieu of the data obtained by converting the first public key.

Accordingly, even a possessor of a secret key paired with the first public key cannot obtain the data used as the parameter for generation of the cipher text unless the data obtained by converting the second public key is determined from the data value applied to the cipher text.

In other words, even the possessor of the secret key paired with the first public key cannot decipher the cipher text unless the cipher text is applied with the data value satisfying the relational expression by which if the data obtained by converting one of the first and second public keys is decided between the data obtained by converting the first public key and the data obtained by converting the second public key, the data obtained by converting the other public key can be determined. On the other hand, in the case where the data value is applied to the cipher text, a possessor of the secret key paired with the second public key too can decipher the cipher text certainly.

Accordingly, a preferred example of application of the second aspect of the present invention is a key recovery system in which the government or the like is able to perform, the decipherment of ciphered confidential data or the like communicated crossing the border, for ensurance of the security based on defensive reasons or the like irrespective of data communicators' or transactors' will.

As mentioned above, the present invention enables key recovery with no need to inform a third party of one's own secret key.

Other objects, features and advantages of the present invention will become apparent when reading the following description of the invention taken in conjunction with the accompanying drawings.

DESCRIPTION OF THE PREFERRED EMBODIMENTS

Embodiments of the present invention will now be described in reference to the drawings.

A key recovery system in the embodiment is realized between a plurality of information processors such as personal computers connected through a network.

Figure 1:
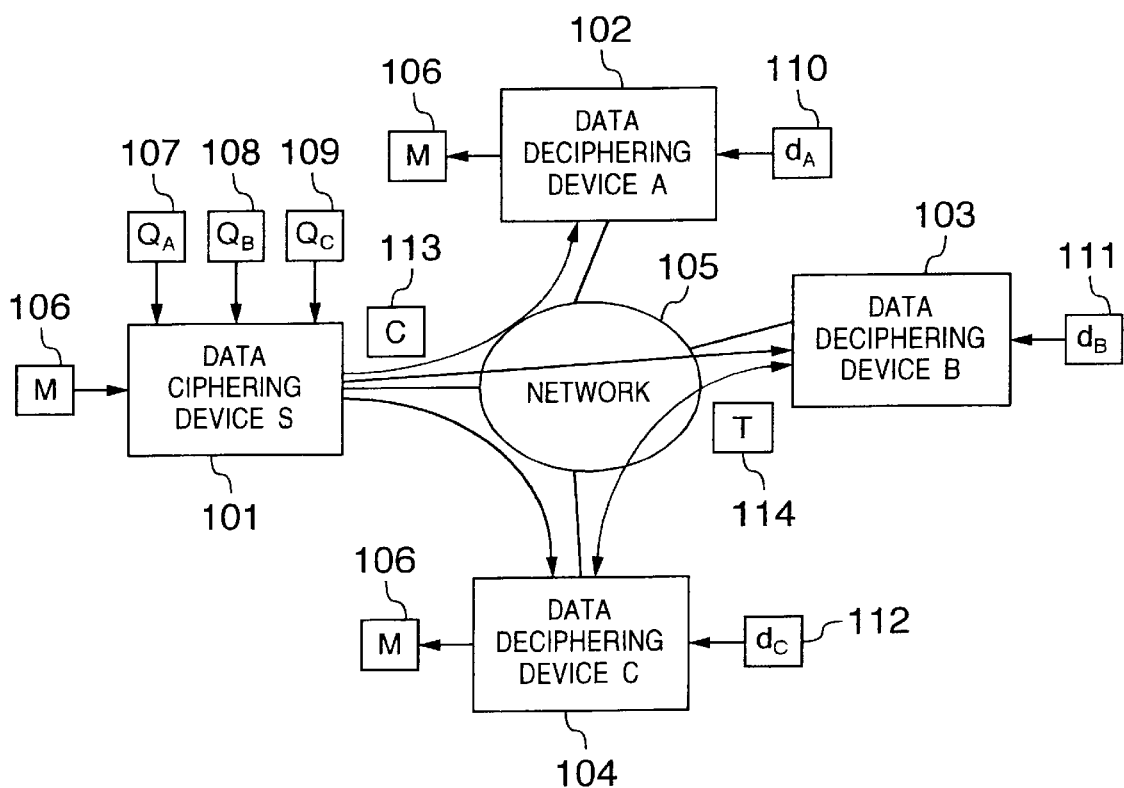
FIG. 1 is a block diagram showing the schematic construction of a key recovery system to which a first embodiment of the present invention is applied.

FIG. 1 shows in block diagram the schematic construction of a key recovery system to which a first embodiment of the present invention is applied.

In FIG. 1, a device S 101 is configured by an information processor such as a personal computer which is provided on the cipher data transmitting side and functions as a data ciphering device. On the other hand, each of devices A 102, B 103 and C 104 is configured by an information processor such as a personal computer which is provided on the cipher data receiving side and functions as a data deciphering device. These devices are interconnected through a network 105.

It is assumed that the device S 101 has already acquired a public key $Q_A$ 107 paired with a secret key $d_A$ 110 possessed by the device A 102, a public key $Q_B$ 108 paired with a secret key $d_B$ 111 possessed by the device B 103, and a public key $Q_C$ 109 paired with a secret key $d_C$ 112 possessed by the device C 104.

The public key $Q_A$ 107 and the secret key $d_A$ 110, the public key $Q_B$ 108 and the secret key $d_B$ 111, and the public key $Q_C$ 109 and the secret key $d_C$ 112 are ones in elliptic curve cipher.

The elliptic curve cipher is a public key cipher generated by defining the addition $(x_1, y_1)+(x_2, y_2)$ of two points $(x_1, y_1)$ and $(x_2, y_2)$ on an elliptic curve represented by $$y^2 = x^3 + ax + b,$$

a by-integer multiplying (or integer-times) operation of $k(x_1, y_1)$, or the like.

The public key $Q_A$ 107 and the secret key $d_A$ 110, the public key $Q_B$ 108 and the secret key $d_B$ 111, and the public key $Q_C$ 109 and the secret key $d_C$ 112 have the following relationships, respectively:

$$Q_A = d_A P$$

$$Q_B = d_B P$$

$$Q_C = d_C P$$

wherein P is called a base point on the elliptic curve and is used as a parameter when the elliptic curve cipher is calculated.

Next, brief description will be made of a processing in the case where the key recovery system in the present embodiment is implemented in the construction shown in FIG. 1.

First, a processing operation performed by the device S 101 functioning as a data ciphering device will be described.

The device S 101 ciphers a message M 106 using obtained by converting the public key $Q_A$ 107 as a parameter. Also, the device S 101 generates a data value satisfying a relational expression by which data obtained by converting the public key $Q_A$ 107 can be determined directly or indirectly if data obtained by converting the public key $Q_B$ 108 and data obtained by converting the public key $Q_C$ 109 are known or decided among the data obtained by converting the public key $Q_A$ 107, the data obtained by converting the public key $Q_B$ 108 and the data obtained by converting the public key $Q_C$ 109.

The device S 101 applies the generated data value to a cipher text of the message M 106 to generate a cipher text C 113 and then transmits the cipher text C to the devices A 102, B 103 and C 104.

Next, processing operation performed by the devices A 102, B 103 and C 104 functioning as data deciphering devices will be described hereinbelow.

First, the device A 102 deciphers the cipher text C 113 singly.

Receiving the cipher text C 113 sent from the device S 101, the device A 102 deciphers the cipher text C 113, using data obtained by converting the secret key $d_A$ 110 as a parameter. This data is the same as the data obtained by converting the public key $Q_A$ 107. Thereby, the original message M 106 is obtained.

Next, the device A 102 deciphers the cipher text C 113 in cooperation with the devices B 103 and C 104. This corresponds to the case where the device A 102 cannot use its own secret key due to the loss, theft, breakage or the like of a card in which the secret key is stored.

The device A 102 requests the devices B 103 and C 104 to transmit data which is obtained by converting the secret keys $d_B$ 111 and $d_C$ 112 possessed by the devices B 103 and C 104.

Receiving the request, the devices B 103 and C 104 obtain data by converting their own secret keys $d_B$ 111 and $d_C$ 112 and transmit the data to the device A 102.

Next, the device A 102 determines the data obtained by converting the public key $Q_A$ 107. The determination is made without the use of the secret key $d_A$ 110 paired with the public key $Q_A$ 107 but on the basis of the data sent from the device B 103 and obtained by converting the secret key $d_B$ 111, the data sent from the device C 104 and obtained by converting the secret key $d_C$ 112, and the data value sent from the device S 101, satisfying the above relational expression and applied to the cipher text C 113. With the determined data used as a parameter, the device A 102 deciphers the cipher text C 113, thereby obtaining the original message M 106.

Next, the description will be made of a processing in the case where the device B 103 deciphers the cipher text C 113 in cooperation with the device C 104.

In the case where the device B 103 deciphers the cipher text C 113 sent from the device S 101, the device B 103 first requests the device C 104 to transmit data which is to be obtained by converting the secret key $d_C$ 112 possessed by the device C 104 itself.

Receiving the request, the device C 104 obtains data by converting the secret key $d_C$ 112 and transmits the obtained data as a token T 114 to the device B 103.

Next, the device B 103 determines the data obtained by converting the public key $Q_A$ 107. The determination is made on the basis of data obtained by converting the secret key $d_B$ 111 possessed by the device B 103 itself, the token T 114 sent from the device C 104 (that is, the data obtained by converting the secret key $d_C$ 112), and the data value sent from the device S 101, satisfying the above relational expression and applied to the cipher text C 113. With the determined data used as a parameter, the device B 103 deciphers the cipher text C 113. Thereby, the original message M 106 is obtained.

In the case where the device C 104 deciphers the cipher text C 113 in cooperation with the device B 103, too, a similar procedure is performed.

Namely, the device C 104 requests the device B 103 to transmit data which is to be obtained by converting the secret key $d_B$ 111 possessed by the device B 103.

Next, the device C 104 determines the data obtained by converting the public key $Q_A$ 107. The determination is made on the basis of data obtained by converting the secret key $d_C$ 112 possessed by the device C 104 itself, the data sent from the device B 103 and obtained by converting the secret key $d_B$ 111, and the data value sent from the device S 101 and applied to the cipher text C 113. With the determined data used as a parameter, the device B 103 deciphers the cipher text C 113.

Now, each device forming the key recovery system of the present embodiment will be described.

First, the description will be made of the device S 101 which functions as a data ciphering device.

Figure 2:
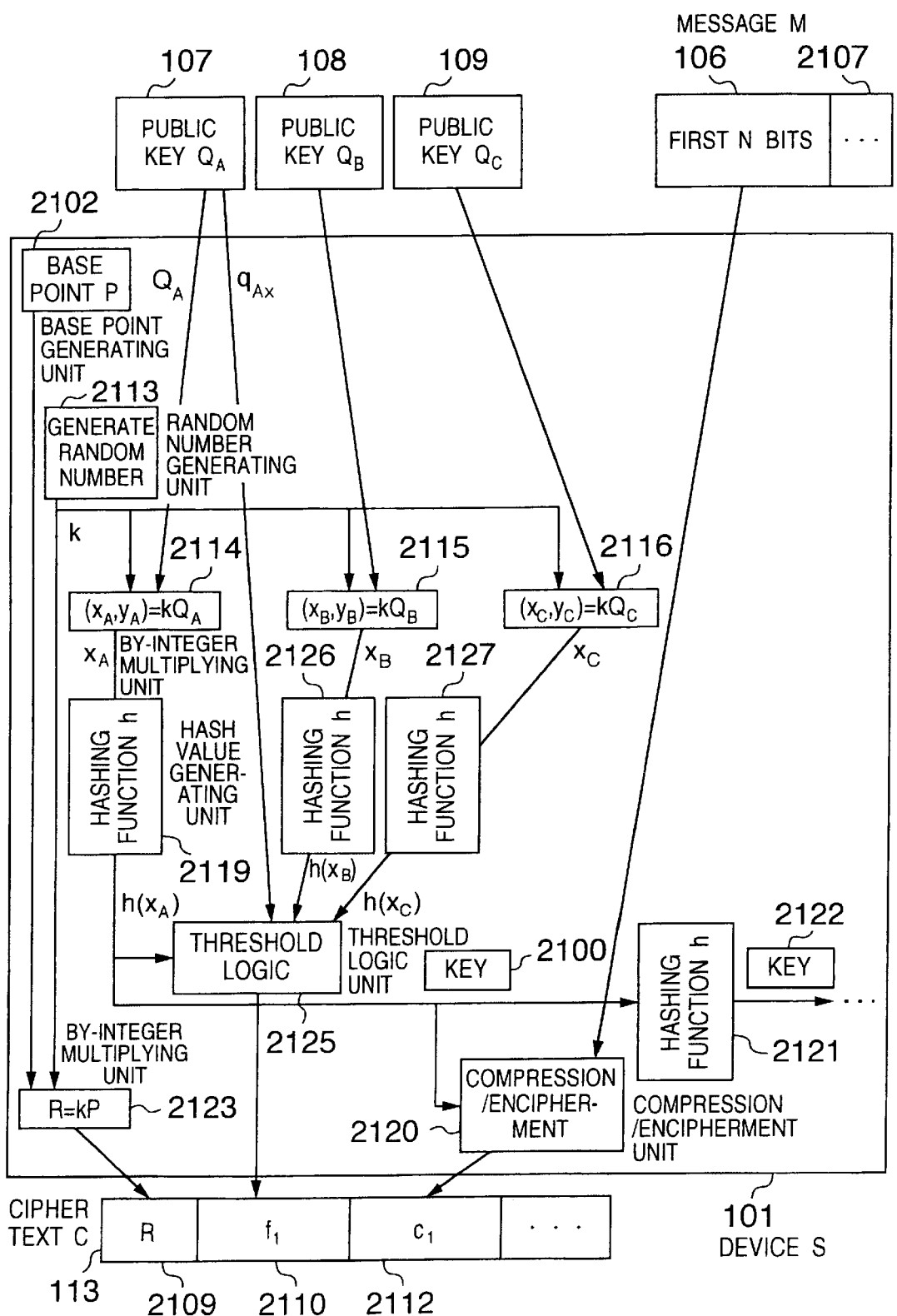
FIG. 2 is a block diagram showing the functional construction of a data ciphering device S 101 shown in FIG. 1.

FIG. 2 shows in block diagram the functional construction of the device S 101 shown in FIG. 1.

The functional construction shown in FIG. 2 can be realized in such a manner that a CPU provided in an information processor such as a personal computer is caused to execute a predetermined program. This program may be stored in a storage medium such as a CD-ROM the contents of which can be read by the personal computer through a driver. Alternatively, there may be used a configuration in which such a program is installed from a server into a memory on the CPU side. Also, the functional construction shown in FIG. 2 may be realized on an IC card mounted to an information processor.

In the device S 101 shown in FIG. 2, a base point generating unit 2102 generates a base point P which is a parameter in elliptic curve cipher.

This base point P is inputted to a by-integer multiplying operation unit 2123 together with a random number k generated by a random number generating unit 2113. Receiving these inputs, the by-integer multiplying operation unit 2123 generates data R 2109 by performing a processing represented by the following equation:

$$R=kP.$$

This data R 2109 forms the first data of a cipher text C 113.

Also, a public key $Q_A$ 107 is inputted to a by-integer multiplying operation unit 2114 together with the random number k generated by the random number generating unit 2113. Receiving these inputs, the by-integer multiplying operation unit 2114 generates a point $(x_A, y_A)$ on the elliptic curve by performing a processing represented by the following equation:

$$(x_A, yA)=kQ_A.$$

The numeric value $x_A$ of $(x_A, y_A)$ is thereafter inputted to a hash value generating unit 2119 and is converted thereby into a hash value $h(x_A)$.

Similarly, a public key $Q_B$ 108 is inputted to a by-integer multiplying operation unit 2115 together with the random number k generated by the random number generating unit 2113. Receiving these inputs, the by-integer multiplying operation unit 2115 generates a point $(x_B, y_B)$ on the elliptic curve by performing a processing represented by the following equation:

$$(x_B, y_B)=kQ_B.$$

The numeric value $x_B$ of $(x_B, y_B)$ is thereafter inputted to a hash value generating unit 2126 and is converted thereby into a hash value $h(x_B)$.

Similarly, a public key $Q_C$ 109 is inputted to a by-integer multiplying operation unit 2116 together with the random number k generated by the random number generating unit 2113. Receiving these inputs, the by-integer multiplying operation unit 2116 generates a point $(x_C, y_C)$ on the elliptic curve by performing a processing represented by the following equation:

$$(x_C, y_C)=kQ_C.$$

The numeric value $x_C$ of $(x_C, y_C)$ is thereafter inputted to a hash value generating unit 2127 and is converted thereby into a hash value $h(x_C)$.

A threshold logic unit 2125 generates a value $f_1$ 2110 satisfying a conditional equation or relational expression by which the hash value $h(x_A)$ generated by the hash value generating unit 2119 can be determined if the hash values $h(x_B)$ and $h(x_C)$ generated by the hash value generating units 2126 and 2127 are decided. This value $f_1$ 2110 forms the second data of the cipher text C 113. The details of the threshold logic unit 2125 will be described later on.

In regard to a message M 106, the first N-bit data 2107 thereof is inputted to a compression and encipherment unit 2120 at the outset. Receiving this data, the compression/encipherment unit 2120 performs a compression/encipherment processing for the first N-bit data, wherein the hash value $h(x_A)$ generated by the hash value generating unit 2119 is used as a key 2100. Thereby, data $C_1$ 2112 is generated. The details of the compression/encipherment processing will be mentioned later on. The data $C_1$ 2112 forms the third data of the cipher text C 113. Also, the key 2100 is inputted to a hash value generating unit 2121 and is converted thereby into a key 2122 for ciphering the second N-bit data of the message M 106.

The above processing is performed for all N-bit data forming the message M 106, thereby generating the cipher text C 113.

The hash value referred to in the above description is short data of a fixed length obtained by subjecting input data to a processing similar to cipher conversion. A hashing function as a function for generating the hash value is requested to have the following characteristics.

1. One-Way Property: Provided that an output value of a certain hashing function is given, it must be difficult in terms of computational complexity to determine another message which brings about the same output value as said output value.

2. Collision Free Property: It does not matter what is either a message or a hash value. In any case, it must be difficult in terms of computational complexity to find out two different messages which result in the same hash value.

Conventionally, this hashing function includes a hashing function using block encipherment, a dedicated block function, and so forth. The hash value generating unit used in the present embodiment can be realized by utilizing those functions.

Next, the description will be made of a processing performed by the threshold logic unit 2125 shown in FIG. 2.

As mentioned above, the threshold logic unit 2125 generates the value f1 2110 satisfying a relational expression by which the hash value $h(x_A)$ can be determined if the hash values $h(x_B)$ and $h(x_C)$ are decided.

Figure 3:
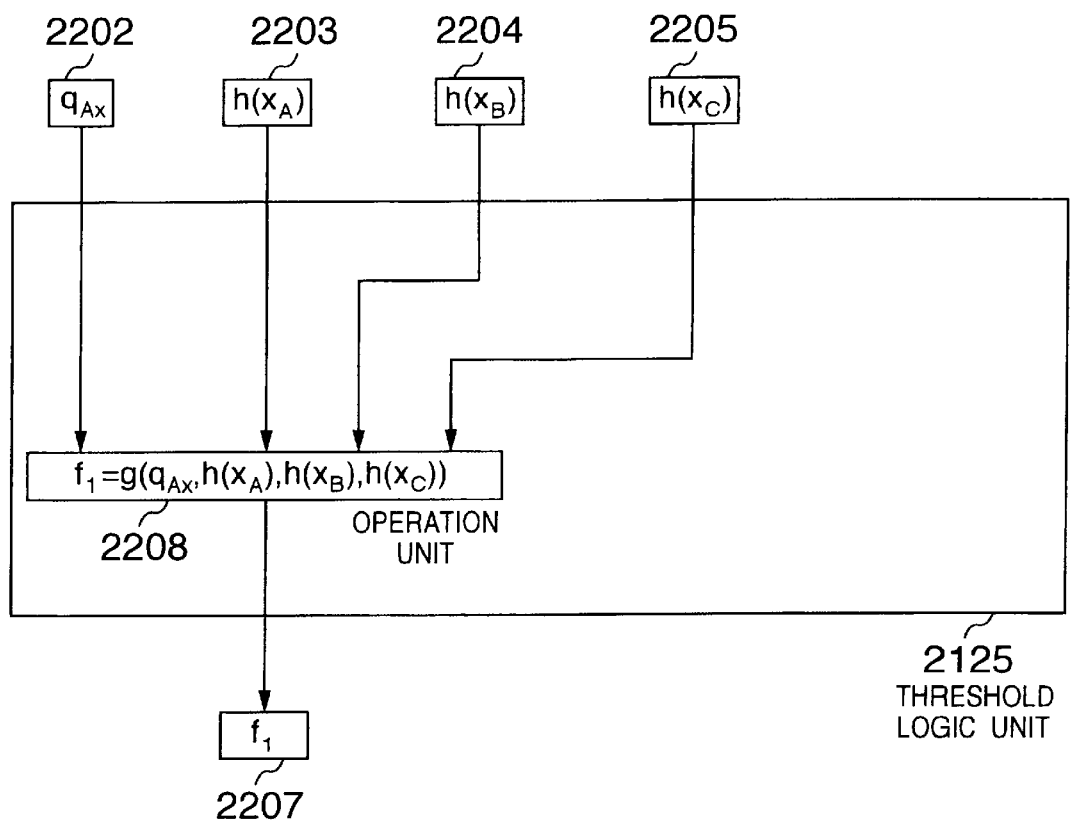
FIG. 3 is a block diagram showing the functional construction of a threshold logic unit 2125 shown in FIG. 2.

FIG. 3 shows in block diagram the functional construction of the threshold logic unit 2125.

As shown in FIG. 3, the threshold logic unit 2125 is inputted with $q_{AX}$ 2202, $h(x_A)$ 2203, $h(x_B)$ 2204 and $h(x_C)$ 2205 wherein $q_{AX}$ 2202 is the x-coordinate value of the public key $Q_A$ 107 in FIG. 2, and $h(x_A)$ 2203, $h(x_B)$ 2204 and $h(x_C)$ 2205 are hash values generated by the hash value generating units 2119, 2126 and 2127, respectively.

An operation unit 2208 generates data $f_1$ 2207 by performing a processing represented by the following equation:

$$f_1 = g(q_{AX}, h(x_A), h(x_B), h(x_C))$$

wherein the function g is defined by $$g(x, a_1, a_2, a_3) = a_1 + a_2 \cdot x + a_3 \cdot x^2 \pmod{n}.$$

Accordingly, the data $f_1$ generated by the operation unit 2208 satisfies the following equation for $q_{AX}$ and $h(x_A)$, $h(x_B)$, $h(x_C)$:

$$f_1 = h(x_A) + h(x_B) q_{AX} + h(x_C) \cdot q_{AX}^2 \pmod{n}.$$

Herein, "mod n" in the above equation indicates a processing in which the residue of division by n is taken. For example, 5(mod 2)=1. Also, n is an integer represented by the number of bits longer or larger than the output length or hash value of the hashing function h used in the hash value generating units 2119, 2126 and 2127.

In the case where the values of $f_1$ and $q_{AX}$ have already been known, it is apparent from the above equation that if any two values among $h(x_A)$, $h(x_B)$ and $h(x_C)$ are known or decided, the other one can be determined (since there results in a simultaneous equation in which the number of unknown quantities is three and the number of equations is one).

Next, a processing operation performed by the compression/encipherment units 2120, - - - shown in FIG. 2 will be described in reference to FIG. 4.

Figure 4:
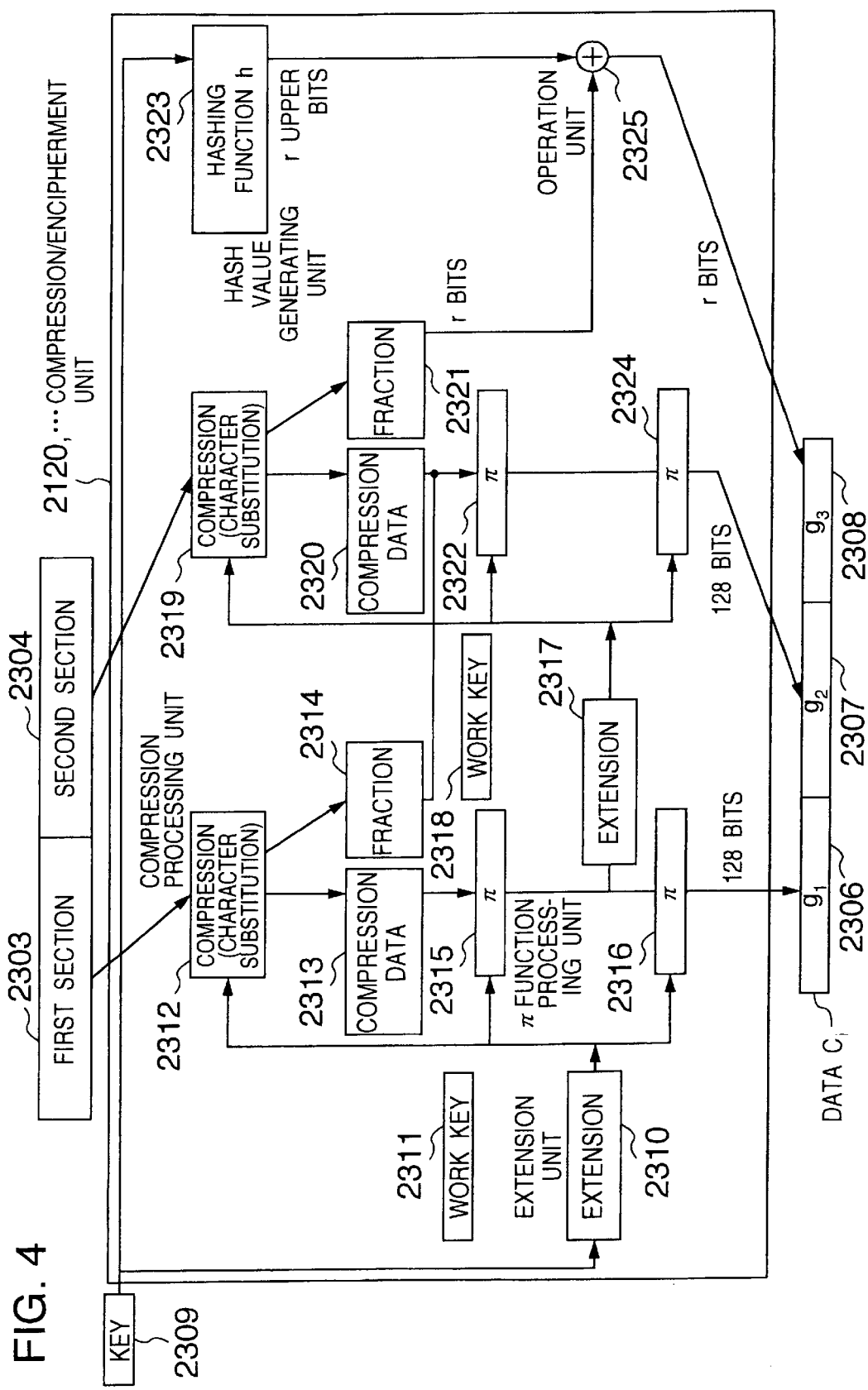
FIG. 4 is a block diagram showing the functional construction of compression/encipherment units 2120, - - - shown in FIG. 2.

FIG. 4 shows in block diagram the functional construction of the compression/encipherment units 2120, - - - shown in FIG. 2.

Herein, N-bit data in FIG. 4 corresponds to N-bit data 2107, - - - which form the message M 106 in FIG. 2. Also, data C; indicates data $C_1$ 2112, - - - which are generated by the compression/encipherment units 2120 in FIG. 2. Further, a key 2309 in FIG. 4 corresponds to the key 2100, 2122, - - - in FIG. 2.

In FIG. 4, when the key 2309 is inputted, an extension unit 2310 receives this key 2309 to generate a plurality of copies thereof and connects these copies to generate a work key 2311.

Also, a first section 2303 being the first data section of the N-bit data is subjected by a compression processing unit 2312 to a compression (or character substitution) processing based on Huffmann compression or the like with a part of the work key 2311 used as a parameter. The result of processing is outputted as 128-bit compression data 2313 and fraction data 2314.

The 128-bit compression data 2313 is subjected by a π function processing unit 2315 to a block encipherment processing with a part of the work key 2311 used as a parameter so that it is converted into 128-bit data. Thereafter, this data is further subjected by a π function processing unit 2316 to a block encipherment processing with a part of the work key 2311 used as a parameter so that it is converted into 128-bit data. This data forms the first data $g_1$ 2306 of data $C_i$ to be generated. The 128-bit data generated by the π function processing unit 2315 is inputted to an extension unit 2317 to generate a plurality of copies. These copies are connected to provide a work key 2318 for ciphering a second section 2304 which is the second data section of the N-bit data.

The second section 2304 of the N-bit data is subjected by a compression processing unit 2319 to a compression (or character substitution) processing based on Huffmann compression or the like with a part of the work key 2318 used as a parameter. The result of processing is outputted as compression data 2320 and fraction data 2321. At this time, the compression data 2320 is generated such that the total bit length thereof inclusive of the fraction data 2314 generated at the time of compression (or character substitution) processing for the first section 2303 comes to 128 bits.

The compression data 2320 is connected to the fraction data 2314 generated at the time of compression (or character substitution) processing for the first section 2303 to provide 128-bit data. Thereafter, the 128-bit data is subjected by a π function processing unit 2322 to a block encipherment processing with a part of the work key 2318 used as a parameter so that it is converted into 128-bit data. Thereafter, this data is further subjected by a π function processing unit 2324 to a block encipherment processing with a part of the work key 2318 used as a parameter so that it is converted into 128-bit data. This data forms the second data $g_2$ 2307 of the data $C_i$ to be generated.

In the case where the fraction data 2321 generated at the time of compression (or character substitution) processing for the second section 2304 has r bits (r≧1), a hash value generating unit 2323 generates a hash value corresponding to the key 2309. Receiving the hash value generated by the hash value generating unit 2323, an operation unit 2325 produces an exclusive logical sum of r upper bits of the hash value and the fraction data 2321 to generate r-bit data. This data forms the third data $g_3$ 2308 of the data $C_i$ to be generated.

With the above processing, cipher data $C_i$ for the N-bit data is generated.

In the present embodiment, the device S 101 functioning as the data ciphering device uses the hash value $h(x_A)$ as an initial value in the encipherment of the message M 106. Accordingly, the determination of the hash value $h(x_A)$ suffices for deciphering the cipher text C 113 ciphered by the device S 101.

In the device S 101, the threshold logic unit 2125 generates the value $f_1$ satisfying a relational expression by which the hash value $h(x_A)$ can be determined if the hash values $h(x_B)$ and $h(x_C)$ are decided, and applies the value $f_1$ to the cipher text C 113.

Therefore, a receiver of the cipher text C 113 (or an acquisitor of $f_1$) can determine $h(x_A)$ used for encipherment if $h(x_B)$ and $h(x_C)$ are decided (though in the example shown in FIG. 2, $q_{AX}$ is further needed).

Accordingly, the decipherment of the cipher text C 113 can be performed not only by the device A 102 which possesses the secret key $d_A$ paired with the public key $Q_A$ (and can determine the hash value $h(x_A)$ singly) but also by the cooperation of the device B 103 which possesses the secret key $d_B$ paired with the public key $Q_B$ (and can determine the hash value $h(x_B)$ singly) and the device C 104 which possesses the secret key $d_C$ paired with the public key $Q_C$ (and can determine the hash value $h(x_C)$ singly).

The former corresponds to a 1-out-of-1 decipherment logic and the latter corresponds to a 2-out-of 2 decipherment logic. Thus, the present embodiment enables a threshold control for the number of receivers which becomes capable of performing decipherment.

Namely, the multi-casting of the cipher text C 113 to the possessors of secret keys $d_A$, $d_B$ and $d_C$ makes it possible for the possessor of secret key $d_A$ to perform decipherment singly and for the possessors of secret keys $d_B$ and $d_C$ to perform decipherment in cooperation with each other even without using the secret key $d_A$.

The data encipherment applied to the present embodiment is the same as the conventional public-key cryptograph or cipher such as RSA (Rivert, Shamir and Adleman) in that a message M is converted into a cipher text by use of a public key. However, it is different from the conventional public-key cryptograph in that for a usual message for which the compression by Huffmann compression or the like is effective, the length of the cipher text becomes shorter than the length of the message, as shown in FIG. 4.

Next, the description will be made of the details of the devices A 102, B 103 and C 104 which function as data deciphering devices.

First, the detailed description will be made of the case where the device A 102 deciphers the cipher text C 113 by use of the secret key $d_A$ 110 possessed by the device A 102 itself.

Figure 5:
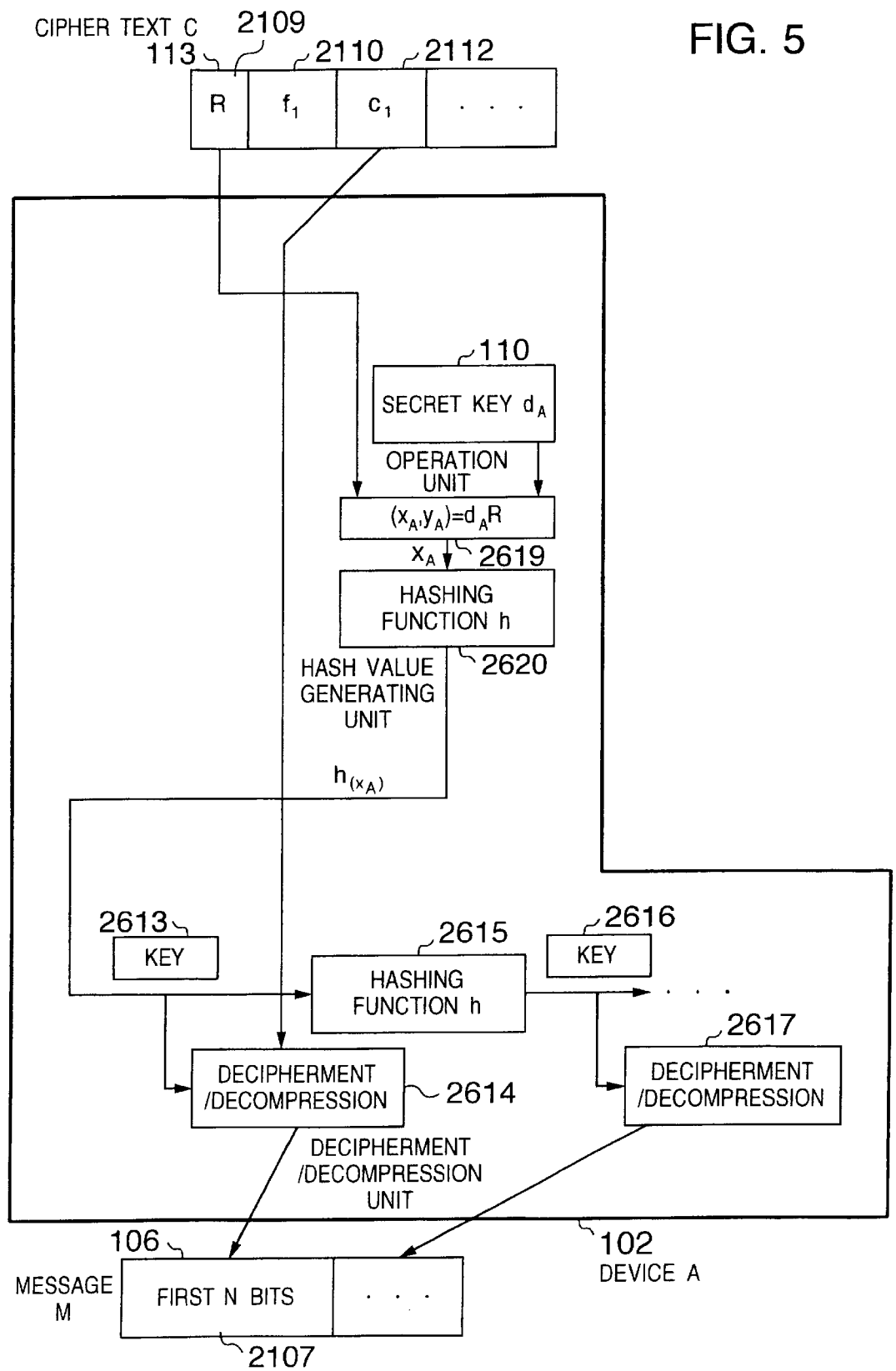
FIG. 5 is a block diagram showing the functional construction of a data deciphering device A 102 shown in FIG. 1 in the case where the device A 102 deciphers a cipher text C 113 by use of a secret key $d_A$ 110 possessed by the device A 102 itself.

FIG. 5 shows in block diagram the functional construction of the device A 102 in the case where the device A 102 shown in FIG. 1 deciphers the cipher text C 113 by use of the secret key $d_A$ 110 possessed by the device A 102 itself.

The functional construction shown in FIG. 5 can be realized in such a manner that a CPU provided in an information processor such as a personal computer is caused to execute a predetermined program. This program may be stored in a storage medium such as a CD-ROM the contents of which can be read by the personal computer through a driver. Alternatively, such a program may be installed from a server into a memory on the CPU side. Also, the functional construction shown in FIG. 5 may be realized on an IC card mounted to an information processor.

In FIG. 5, when a cipher text C 113 is inputted to the device A 102, an operation unit 2619 reads a secret key $d_A$ 110 which is stored in the device A 102 itself and is paired with a pubic key $Q_A$ 107. The operation unit 2619 determines a point $(x_A, y_A)$ on an elliptic curve which satisfies the following equation between the secret key $d_A$ 110 and the first data R 2109 of the cipher text C 113:

$$(x_A, y_A) = d_A R.$$

A hash value generating unit 2620 generates a hash value $h(x_A)$ for the x-coordinate value $x_A$ of $(x_A, y_A)$ determined by the operation unit 2619.

This hash value $h(x_A)$ coincides with the hash value $h(x_A)$ generated by the hash value generating unit 2119 shown in FIG. 2. The reason will now be mentioned.

In the hash value generating unit 2119 in FIG. 2, $(x_A, y_A) = kQ_A$ is determined using the random number k generated by the random number generating unit 2113 and a hash value for the x-coordinate value $x_A$ of $(x_A, y_B)$ is taken as $h(x_A)$.

On the other hand, in the hash value generating unit 2620 shown in FIG. 5, $(x_A, y_A) = d_A R$ is determined using R determined in accordance with R=kP by use of the same random number k as mentioned above and a hash value for the x-coordinate value $x_A$ of $(x_A, x_B)$ is taken as $h(x_A)$.

Hereupon, $Q_A = d_A P$ is satisfied from the relationship between a secret key and a public key in elliptic curve cipher. Accordingly, there results in $$d_A R = d_A kP = kd_A P = kQ_A = (x_A, y_A).$$

Thus, the hash value $h(x_A)$ generated by the hash value generating unit 2620 shown in FIG. 5 coincides with the hash value $h(x_A)$ generated by the hash value generating unit 2119 shown in FIG. 2.

A decipherment/decompression unit 2614 uses as a key 2613 the hash value $h(x_A)$ generated by the hash value generating unit 2620 to perform a decipherment/decompression processing for the third data $C_1$ 2112 of the cipher text C 113 (that is, the cipher data corresponding to the first N-bit data of the message M 106). Thereby, the first N-bit data 2107 of the message M 106 is generated.

Also, a decipherment/decompression unit 2617 uses as a new key 2616 a new hash value generated by a hash value generating unit 2615 on the basis of the key 2613 to perform a decipherment/decompression processing for the fourth data of the cipher text C 113 (that is, the cipher data corresponding to the second N-bit data of the message M 106). Thereby, the second N-bit data of the message M 106 is generated.

The above processing is successively repeated up to the last data forming the cipher text C 113, thereby restoring the message M 106.

Thereupon, the description will be made of the decipherment/decompression units 2614, 2617, - - - shown in FIG. 5.

Figure 6:
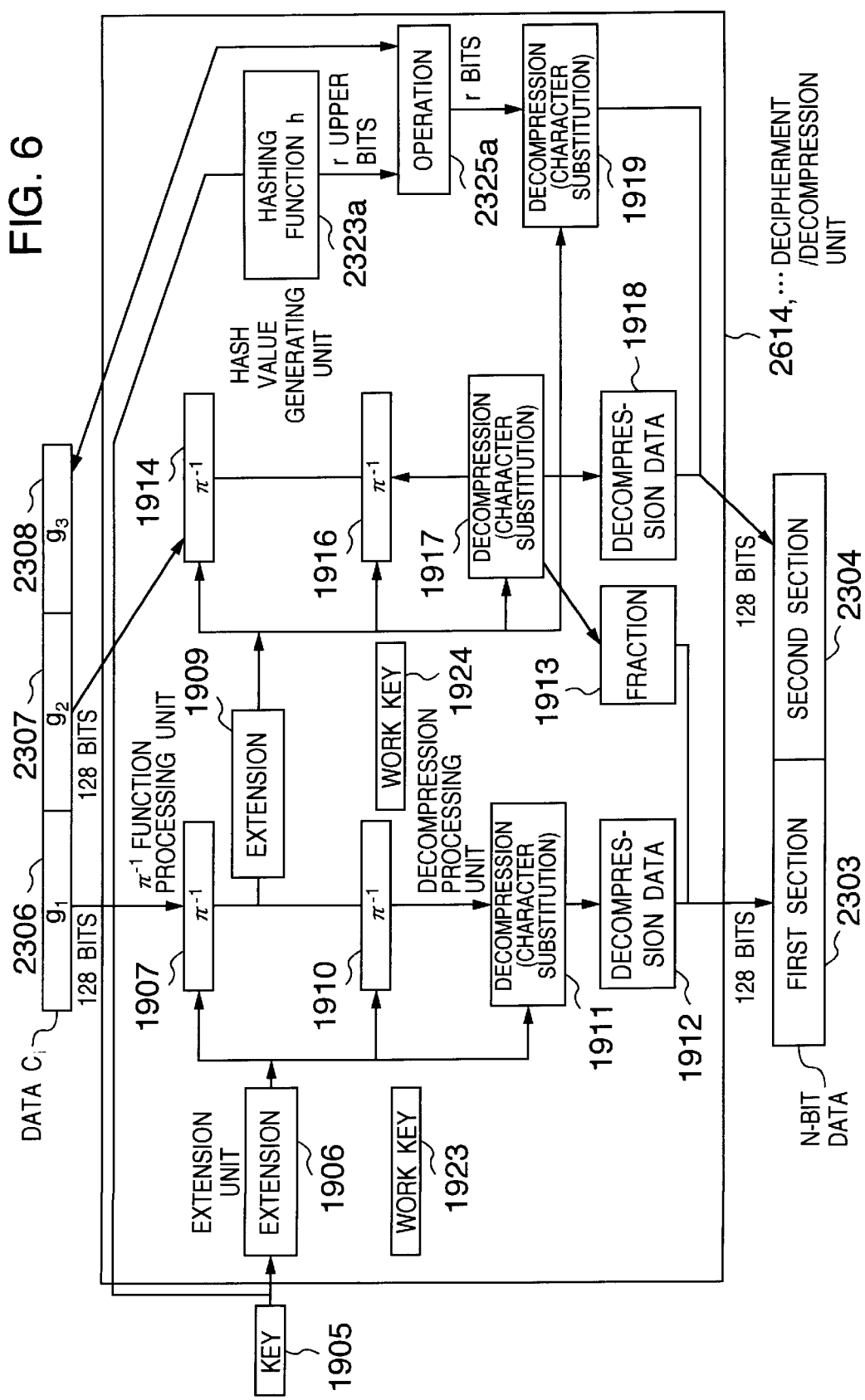
FIG. 6 is a block diagram showing the functional construction of decipherment/decompression units 2614, 2617, - - - shown in FIG. 5.

FIG. 6 shows in block diagram the functional construction of the decipherment/decompression units 2614, 2617, - - - shown in FIG. 5.

In FIG. 6, data $C_i$ represents the third or subsequent data $C_1$ 2112, - - - of the cipher text C 113 in FIG. 5. Also, N-bit data corresponds to the N-bit data 2107, - - - generated by the decipherment/decompression unit 2614, 2617, - - - . Further, a key 1905 corresponds to the key 2613, 2616 in FIG. 5.

Also, a $\pi^{-1}$ function processing unit 1907, 1910, 1914, 1916 performs a processing with an inverse function relation to the block encipherment processing by the $\pi$ function processing unit 2315, 2316, 2322, 2324 shown in FIG. 4. Namely, the $\pi^{-1}$ function is an inverse function of the $\pi$ function.

In the case where the same parameter is set to the $\pi$ function and the $\pi^{-1}$ function, data $\pi(m)$ obtained by subjecting data m to conversion by the $\pi$ function returns to the original data m if the data $\pi(m)$ is further subjected to conversion by the $\pi^{-1}$ function. Namely, the $\pi^{-1}$ function and the $\pi$ function have the following relationship:

$$m = \pi^{-1}(\pi(m)).$$

Also, a decompression processing unit 1911, 1917 performs a processing with an inverse conversion relation to the processing performed by the compression processing unit 2312, 2319 shown in FIG. 4.

In the case where the same parameter is set to the compression processing unit and the decompression processing unit, data resulting from subjecting data m to a compression (or character substitution) processing returns to the original data m if the resultant data is further subjected to a decompression (or character substitution) processing.

In FIG. 6, when a key 1905 is inputted, an extension unit 1906 receives this key 1905 to generate a plurality of copies thereof and connects these copies to generate a work key 1923.

Also, the first 128-bit data $g_1$ 2306 is subjected by a $\pi^{-1}$ function processing unit 1907 to a character substitution/transposition processing with a part of the work key 1923 used as a parameter so that it is converted into 128-bit data. Thereafter, this data is further subjected by a $\pi^{-1}$ function processing unit 1910 to a character substitution/transposition processing with a part of the work key 1923 used as a parameter so that it is converted into 128-bit data.

The output result of the $\pi^{-1}$ function processing unit 1910 is subjected, by a decompression processing unit 1911, to decompression (or character substitution) processing with a part of the work key 1923 used as a parameter. The result of this processing is outputted as decompression data 1912. Also, the 128-bit data generated by the $\pi^{-1}$ function processing unit 1907 is inputted to an extension unit 1909 to generate a plurality of copies. These copies are connected to provide a work key 1924 for deciphering the second 128-bit data $g_2$ 2307 of the data $C_i$.

The second 128-bit data $g_2$ 2307 of the data $C_i$ is subjected, by a $\pi^{-1}$ function processing unit 1914, to a character substitution/transposition processing with a part of the work key 1924 used as a parameter so that it is converted into 128-bit data. Thereafter, this data is further subjected, by a $\pi^{-1}$ function processing unit 1916, to a character substitution/transposition processing with a part of the work key 1924 used as a parameter so that it is converted into 128-bit data.

The output result of the $\pi^{-1}$ function processing unit 1916 is subjected, by a decompression processing unit 1917 to decompression (or character substitution) processing with a part of the work key 1924 used as a parameter. The result of this processing is outputted as decompression data 1918 and fraction data 1913.

The fraction data 1913 is connected to the decompression data 1912 generated at the time of decompression (or character substitution) processing for the data $g_1$ 2306. The resultant data provides the first section data 2303 of N-bit data to be generated.

The third data of the data $C_i$ or r-bit data $g_3$ 2308 is inputted to an operation unit 2325a together with r upper bits of a hash value for the key 1905 generated by a hash value generating unit 2323a. Receiving these inputs, the operation unit 2325a generates $D_r$ satisfying the following equation:

$$D_r \text{ XOR } h_r = g_2 \ (XOR \text{ or } (ea): \text{ exclusive logical sum})$$

wherein $h_r$ is the r upper bits of the hash value generated by the hash value generating unit 2323a and $D_r$ is r-bit data to be generated.

The r-bit data $D_r$ generated by the operation unit 2325a is subjected, by a decompression processing unit 1919, to decompression (or character substitution) processing with a part of the work key 1924 used as a parameter. The result of this processing is connected to the decompression data 1918 generated at the time of decompression (or character substitution) processing for the data $8_2$ 2307. The resultant data provides the second section data 2304 of the N-bit data to be generated.

Thus, the N-bit data is generated.

Next, the description will be made of the case where the device A 101 deciphers the cipher text C 113 in cooperation with the devices B 103 and C 104 when the device A 101 has lost the key $d_A$ 110.

Figure 7:
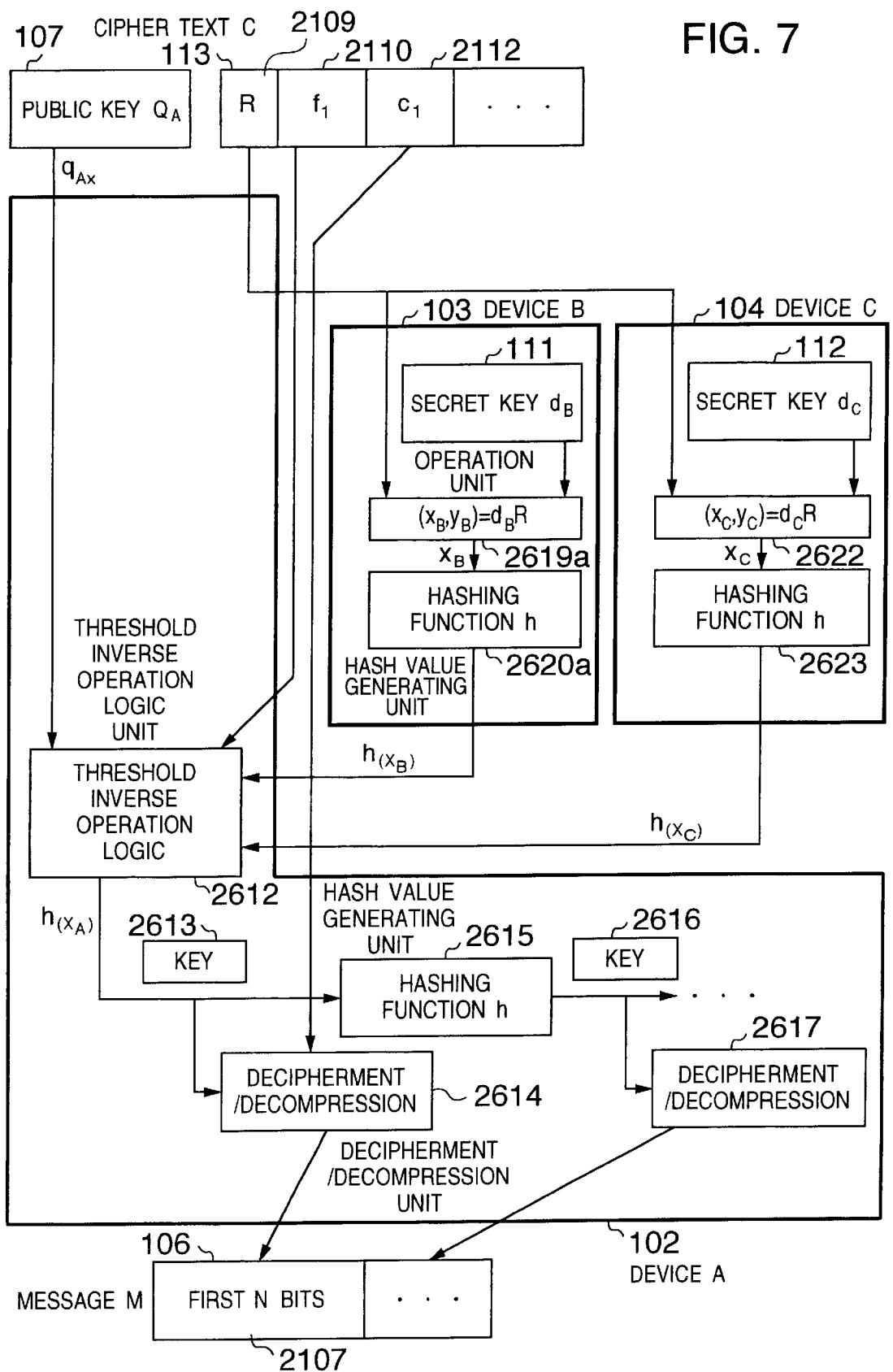
FIG. 7 is a block diagram showing the functional construction of the data deciphering devices A 102, B 103 and C 104 in the case where the device A 102 deciphers the cipher text C 113 in cooperation with the devices B 103 and C 104 when the device A 102 has lost the key $d_A$ 110.

FIG. 7 shows in block diagram the functional construction of the devices A 102, B 103 and C 104 in the case where the device A 101 deciphers the cipher text C 113 in cooperation with the devices B 103 and C 104 when the device A 101 has lost the key $d_A$ 110. In FIG. 7, the same components as those in FIG. 5 are denoted by the same reference numerals as those used in FIG. 5.

The functional construction shown in FIG. 7 can be realized in such a manner that a CPU provided in an information processor such as a personal computer is caused to execute a predetermined program. This program may be stored in a storage medium such as a CD-ROM the contents of which can be read by the personal computer through a driver. Alternatively, such a program may be installed from a server into a memory on the CPU side. Also, the functional construction shown in FIG. 7 may be realized on an IC card mounted to an information processor.

First, the device A 101 transmits the first data R 2109 of the received cipher text C 113 to the devices B 103 and C 104.

Receiving the data R 2109, the device B 103 reads a secret key $d_B$ 111 which is stored in the device B 103 itself and is paired with a public key $Q_B$ 108. An operation unit 2619a determines a point $(x_B, y_B)$ on an elliptic curve which satisfies the following equation between the secret key $d_B$ 111 and the value R sent from the device A 102:

$$(x_B, y_B) = d_B R.$$

Thereafter, a hash value generating unit 2620a generates a hash value $h(x_B)$ for the x-coordinate value $x_B$ of $(x_B, y_B)$ determined by the operation unit 2619a. The hash value $h(x_B)$ is transmitted to the device A 101.

Similarly, the device C 104 reads a secret key $d_C$ 112 which is stored in the device C 104 itself and is paired with a public key $Q_C$ 109. An operation unit 2622 determines a point $(x_C, y_C)$ on an elliptic curve which satisfies the following equation between the secret key $d_C$ 112 and the value R sent from the device A 102:

$$(x_C, y_C) = d_C R.$$

Thereafter, a hash value generating unit 2623 generates a hash value $h(x_C)$ for the x-coordinate value $x_C$ of $(x_C, y_C)$ determined by the operation unit 2622. The hash value $h(x_C)$ is transmitted to the device A 101.

The hash values $h(x_B)$ and $h(x_C)$ coincide with the hash values $h(x_B)$ and $h(x_C)$ generated by the hash value generating unit 2126 and 2127 shown in FIG. 2, respectively. The reason will now be mentioned.

In the hash value generating unit 2126 in FIG. 2, $(x_B, y_B) = kQ_B$ is determined using the random number k generated by the random number generating unit 2113 and a hash value for the x-coordinate value $x_B$ of $(x_B, y_B)$ is taken as $h(x_B)$. Similarly, in the hash value generating unit 2127, $(x_C, y_C) = kQ_C$ is determined using the random number k and a hash value for the x-coordinate value $x_C$ of $(x_C, y_C)$ is taken as $h(x_C)$.

On the other hand, in the hash value generating unit 2620a shown in FIG. 7, $(x_B, y_B) = d_B R$ is determined using R determined in accordance with R=kP by use of the same random number k as mentioned above and a hash value for the x-coordinate value $x_B$ of $(x_B, y_B)$ is taken as $h(x_B)$. Similarly, in the hash value generating unit 2623, $(x_C, y_C) = d_C R$ is determined using R and a hash value for the x-coordinate value $x_C$ of $(x_C, y_C)$ is taken as $h(x_C)$.

Hereupon, $Q_B = d_B P$ and $Q_C = d_C P$ are satisfied from the relationship between a secret key and a public key in elliptic curve cipher. Accordingly, there results in $$d_B R = d_B k P = k d_B P = k Q_B = (x_B, y_B)$$

$$d_C R = d_C k P = k d_C P = k Q_C = (x_C, y_C).$$

Thus, the hash values $h(x_B)$ and $h(x_C)$ generated by the hash value generating units 2620a and 2623 shown in FIG. 7 coincide with the hash values $h(x_B)$ and $h(x_C)$ generated by the hash value generating units 2126 and 2127 shown in FIG. 2, respectively.

Receiving the hash values $h(x_B)$ and $h(x_C)$ from the devices B 103 and C 104, the device A 102 starts a processing by a threshold inverse operation logic unit 2612.

The threshold inverse operation logic unit 2612 first receives the hash value $h(x_B)$ sent from the device B 103, the hash value $h(x_C)$ sent from the device C 104, the x-coordinate value $q_{AX}$ of the public key $Q_A$ 107 and the second data $f_1$ 2110 of the cipher text C 113.

And, the threshold inverse operation logic unit 2612 generates $h(x_A)$ satisfying the following equation:

$$f_1 = h(x_A) + h(x_B) \cdot q_{AX} + h(x_C) \cdot q_{AX}^2 \pmod{n}.$$

This equation corresponds to the case where $h(x_B)$ and $h(x_C)$ among the hash values $h(x_A)$, $h(x_B)$ and $h(x_C)$ generated by the hash value generating units 2119, 2126 and 2127 have already been known.

As mentioned above, the hash values $h(x_B)$ and $h(x_C)$ generated by the hash value generating units 2620a and 2623 shown in FIG. 7 coincide with the hash values $h(x_B)$ and $h(x_C)$ generated by the hash value generating units 2126 and 2127 shown in FIG. 2, respectively. Accordingly, there results in that $h(x_A)$ determined from the above equation coincides with the hash value $h(x_A)$ generated by the hash value generating unit 2119 shown in FIG. 2.

A decipherment/decompression unit 2614 uses as a key 2613 the hash value $h(x_A)$ generated by the threshold inverse operation logic unit 2612 to perform a decipherment/decompression processing for the third data $C_1$ 2112 of the cipher text C 113 (that is, the cipher data corresponding to the first N-bit data of the message M 106). Thereby, the first N-bit data 2107 of the message M 106 is generated.

Also, a decipherment/decompression unit 2617 uses as a new key 2616 a new hash value generated by a hash value generating unit 2615 on the basis of the key 2613 to perform a decipherment/decompression processing for the fourth data of the cipher text C 113 (that is, the cipher data corresponding to the second N-bit data of the message M 106). Thereby, the second N-bit data of the message M 106 is generated.

The above processing is successively repeated up to the last data forming the cipher text C 113, thereby restoring the message M 106.

The above description referring to FIG. 7 has been made in conjunction with the case where the device A 101 deciphers the cipher text C 113 in cooperation with the devices B 103 and C 104 when the device A 102 has lost the key $d_A$ 110. Herein, the device B 103 or C 104 may be a facility which makes preservation in compliance with the deposition of a public key (that is, a key preserving facility). Such a facility can have a function capable of inspecting a cipher text under a legal procedure. Further, it is applicable as an information managing mechanism in an enterprise or firm.

Next, the description will be made of the case where the device B 103 cooperates with the device C 104 to decipher the cipher text C 113 sent from the device S 101.

Figure 8:
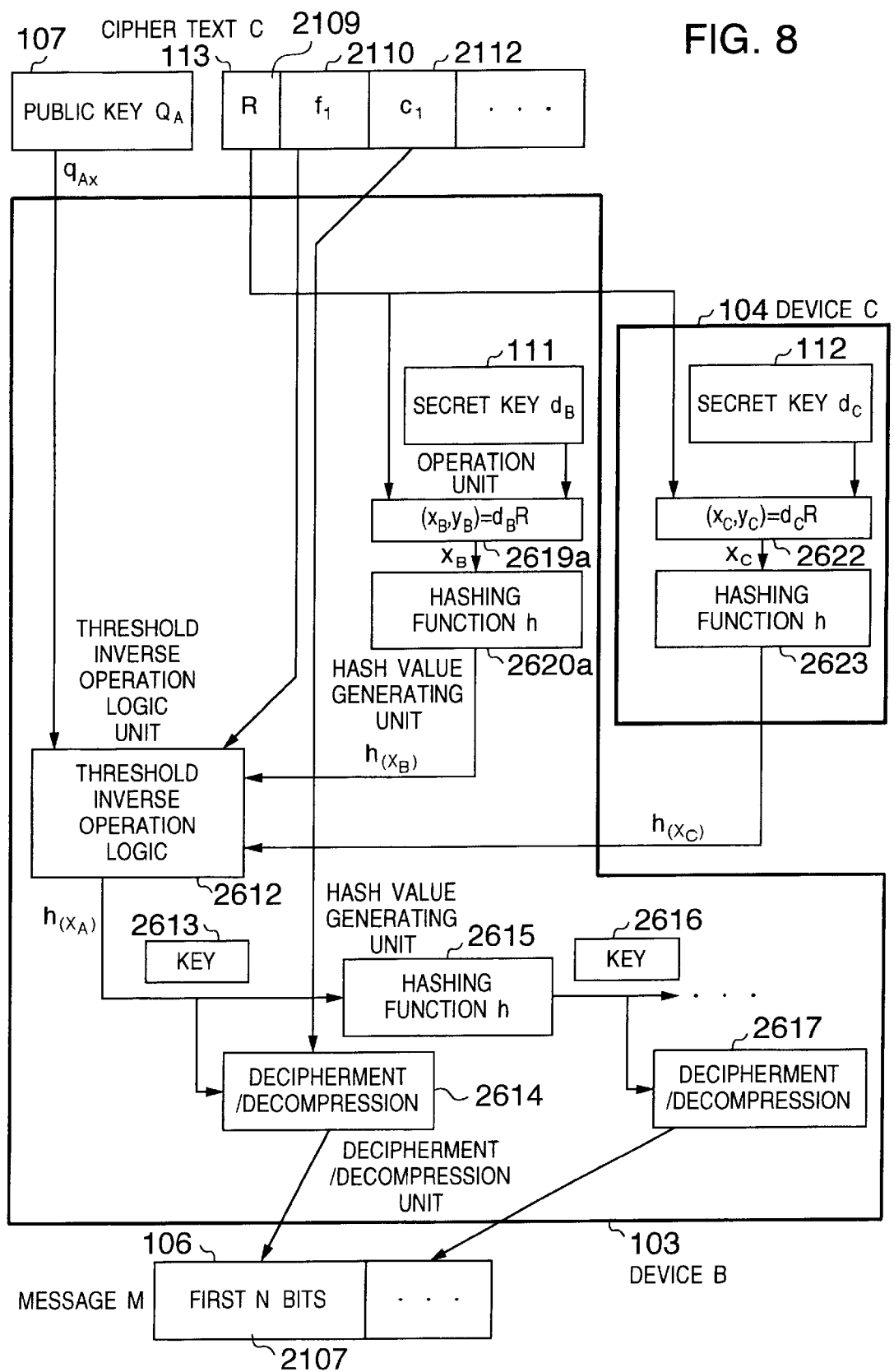
FIG. 8 is a block diagram showing the functional construction of the data deciphering devices B 103 and C 104 in the case where the cipher text C 113 sent from the data ciphering device S 101 is deciphered by the device B 103 in cooperation with the device C 104.

FIG. 8 shows in block diagram the functional construction of the devices B 103 and C 104 in the case where the device B 103 cooperates with the device C 104 to decipher the cipher text C 113 sent from the device S 101. In FIG. 8, the same components as those in FIG. 7 are denoted by the same reference numerals as those used in FIG. 7.

The functional construction shown in FIG. 8 can be realized in such a manner that a CPU provided in an information processor such as a personal computer is caused to execute a predetermined program. This program may be stored in a storage medium such as a CD-ROM the contents of which can be read by the personal computer through a driver. Alternatively, such a program may be installed from a server into a memory on the CPU side. Also, the functional construction shown in FIG. 8 may be realized on an IC card mounted to an information processor.

In FIG. 8, when a public key $Q_A$ 107 and a cipher text C 113 are inputted to the device B 103, an operation unit 2619a reads a secret key $d_B$ 111 stored in the device B 103 itself and paired with a public key $Q_B$ 108.

And, the operation unit 2619a determines a point $(x_B, y_B)$ on an elliptic curve which satisfies the following equation between the read secret key $d_B$ 111 and the first data R 2109 of the cipher text C 113:

$$(x_B, y_B) = d_B R.$$

A hash value generating unit 2620a generates a hash value $h(x_B)$ for the x-coordinate value $x_B$ of $(x_B, y_B)$ determined by the operation unit 2619a.

Also, the device B 103 transmits the first data R 2109 of the cipher text C 113 to the device C 104.

Receiving the data R 2109, the device C 104 reads a secret key $d_C$ 112 stored in the device C 104 itself paired with a public key $Q_C$ 109. An operation unit 2622 determines a point ($x_C$, $y_C$) on the elliptic curve which satisfies the following equation between the read secret key $d_C$ 112 and the first data R 2109 of the cipher text C 113:

$$(x_C, y_C) = d_C R.$$

Thereafter, a hash value generating unit 2623 generates a hash value $h(x_C)$ for the x-coordinate value $x_C$ of ($x_C$, $y_C$) determined by the operation unit 2622. The hash value $h(x_C)$ is transmitted to the device B 103.

Receiving the hash value $h(x_C)$ from the device C 104, the device B 103 starts a processing by a threshold inverse operation logic unit 2612.

The threshold inverse operation logic unit 2612 first receives the hash value $h(x_B)$ generated by the hash value generating unit 2620a, the hash value $h(x_C)$ sent from the device C 104, the x-coordinate value $q_{AX}$ of the public key $Q_A$ 107 and the second data $f_1$ 2110 of the cipher text C 113.

And, the threshold inverse operation logic unit 2612 generates $h(x_A)$ satisfying the following equation:

$$f_1 = h(x_A) + h(x_B) \cdot q_{AX} + h(x_C) \cdot q_{AX}^2 \pmod{n}.$$

A decipherment/decompression unit 2614 uses as a key 2613 the hash value $h(x_A)$ generated by the threshold inverse operation logic unit 2612 to perform a decipherment/decompression processing for the third data $C_1$ 2112 of the cipher text C 113 (that is, the cipher data corresponding to the first N-bit data of the message M 106). Thereby, the first N-bit data 2107 of the message M 106 is generated.

Also, a decipherment/decompression unit 2617 uses as a new key 2616 a new hash value generated by a hash value generating unit 2615 on the basis of the key 2613 to perform a decipherment/decompression processing for the fourth data of the cipher text C 113 (that is, the cipher data corresponding to the second N-bit data of the message M 106). Thereby, the second N-bit data of the message M 106 is generated.

The above processing is successively repeated up to the last data forming the cipher text C 113, thereby restoring the message M 106.

In the present embodiment mentioned above, the cipher text C 113 is applied with the value $f_1$ 2110 satisfying a relational expression by which the hash value $h(x_A)$ can be determined directly or indirectly if $h(x_B)$ and $h(x_C)$ are decided among the hash value $h(x_B)$ determined from the public key $Q_B$ 108, the hash value $h(x_C)$ determined from the public key $Q_C$ 109, and the hash value $h(x_A)$ determined from the public key $Q_A$ 107 and used for the encipherment of the message M 106.

Thereupon, the devices B 103 and C 104 can determine the hash values $h(x_B)$ and $h(x_C)$ from the secret keys $d_B$ 111 and $d_C$ 112 possessed by the devices B 102 and C 104 themselves.

Thus, the hash value $h(x_A)$ used for the encipherment of the message M 106 can be determined in such a manner that the devices B 103 and C 104 cooperates with each other. Therefore, even in the case where the device A 104 has lost the secret key $d_A$ 110 possessed by the device A 104 itself, the device A 102 can restore the cipher text C 113 to the original message M 106 in cooperation with the devices B 103 and C 104.

In the conventional key recovery system, there is a fear that in the case where information concerning ones' own secret key has leaked from a key preserving facility, it becomes impossible to perform secure data encipherment. In the present embodiment, such a problem is not generated since the need to deposit ones's own secret key in the key preserving facility is eliminated. In addition, since the above-mentioned value $f_1$ 2110 depends upon the values of the public keys $Q_B$ 108 and $Q_C$ 109, it is possible to change the contents of the value $f_1$ 2110 by changing a cooperator (more particularly, a public key paired with a secret key possessed by the cooperator). Therefore, it is possible to further improve the confidentiality.

In the case where the present embodiment is materialized in a configuration in which $f_1$, $f_2$, - - -, and $f_n$ are included in a cipher text and the cipher text is multi-cast to n fellows, it is possible to enable some of the n fellows to perform decipherment singly and the remaining fellows to perform decipherment through the cooperation of at least two fellows with each other. It is also possible to enable each of n fellows to perform decipherment singly.

Figure 9:
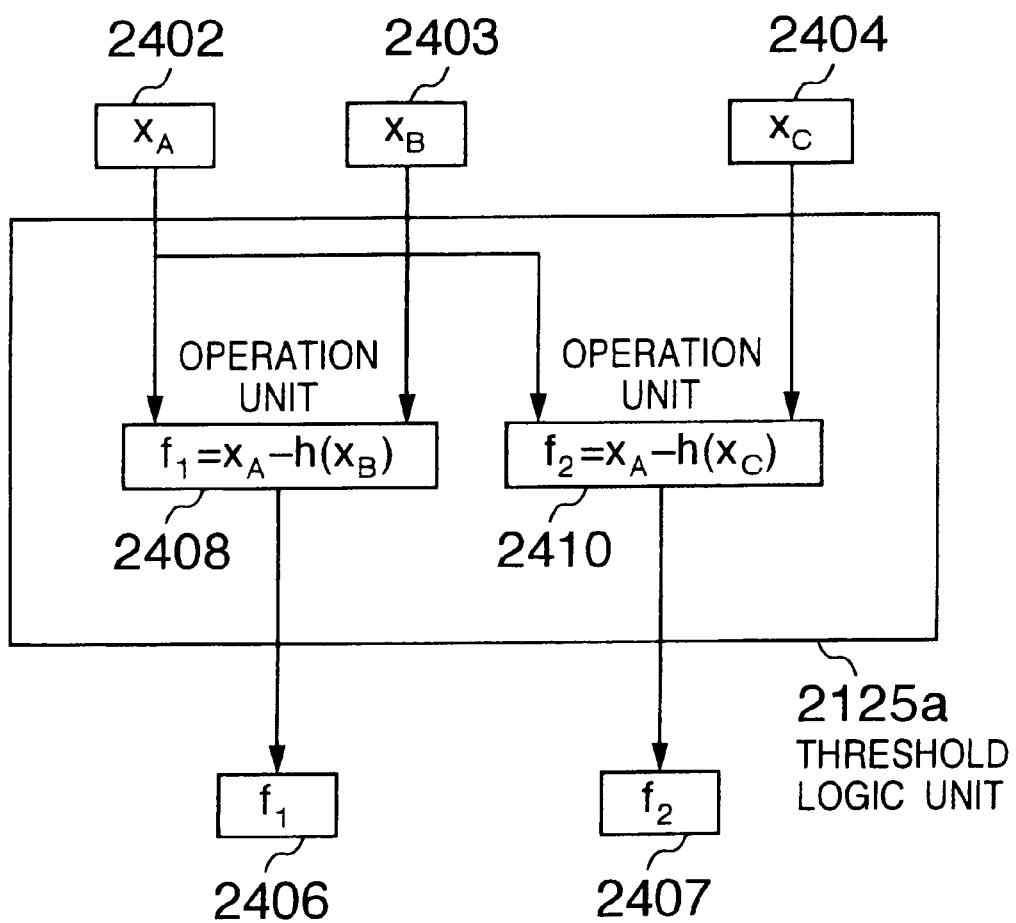
FIG. 9 is a block diagram showing the functional construction of a modified version of the threshold logic unit shown in FIG. 2.

FIG. 9 is a diagram showing the functional construction of a modified version of the threshold logic unit shown in FIG. 2.

As shown in FIG. 9, a threshold logic unit 2125a is inputted with three data $x_A$ 2402, $x_B$ 2403 and $x_C$ 2404.

The data $x_A$ 2402, $x_B$ 2403 and $x_C$ 2404 are the x-coordinate values respectively generated by the by-integer multiplying operation units 2114, 2115 and 2116 shown in FIG. 2.

An operation unit 2408 generates data $f_1$ 2406 by performing a processing represented by the following equation:

$$f_1 = x_A h(x_B)$$

wherein $h(x_B)$ is a hash value generated by the hash value generating unit 2126 shown in FIG. 2.

Also, an operation unit 2410 generates data $f_2$ 2407 by performing a processing represented by the following equation:

$$f_2 = x_A \cdot h(x_C)$$

wherein $h(x_C)$ is a hash value generated by the hash value generating unit 2127 shown in FIG. 2.

With the use of the threshold logic unit 2125a shown in FIG. 9, the device S 101 shown in FIG. 2 generates the data $f_1$ 2406 on the basis of the random number k generated in the course of encipherment processing and the public key $Q_B$ 108. This data $f_1$ is applied to the cipher text C 113 so that the possessor of the secret key $d_B$ 111 having a paired relation with the public key $Q_B$ 108 or the device B 103 too can decipher the cipher text C 113 singly.

Similarly, the device S 101 generates the data $f_2$ 2407 on the basis of the random number k generated in the course of encipherment processing and the public key $Q_C$ 109. This data $f_2$ is applied to the cipher text C 113 so that the possessor of the secret key $d_C$ 112 having a paired relation with the public key $Q_C$ 109 or the device C 104 too can decipher the cipher text C 113 singly.

Namely, with the multi-casting of the cipher text C 113 to the possessors of the secret keys $d_A$ 110, $d_B$ 111 and $d_C$ 112, each of the possessors is enabled to decipher the cipher text singly. Also, since the increase of data by the length of a hash value (for example, 80 bits) suffices for the increase of one in the number of fellows for multi-casting, the multi-casting can be performed efficiently. Herein, the hashing function is only requested to have the one-way property and is not requested to have the collision free property.

The present embodiment has been described in conjunction with the case where the first data of the cipher text C 113 includes both the x-coordinate and y-coordinate values of the point R on the elliptic curve generated by the by-integer multiplying operation unit 2123. However, the key recovery system of the present invention can be realized even in the case where the first data of the cipher text C 113 includes only one of the x-coordinate and y-coordinate values.

Figure 10:
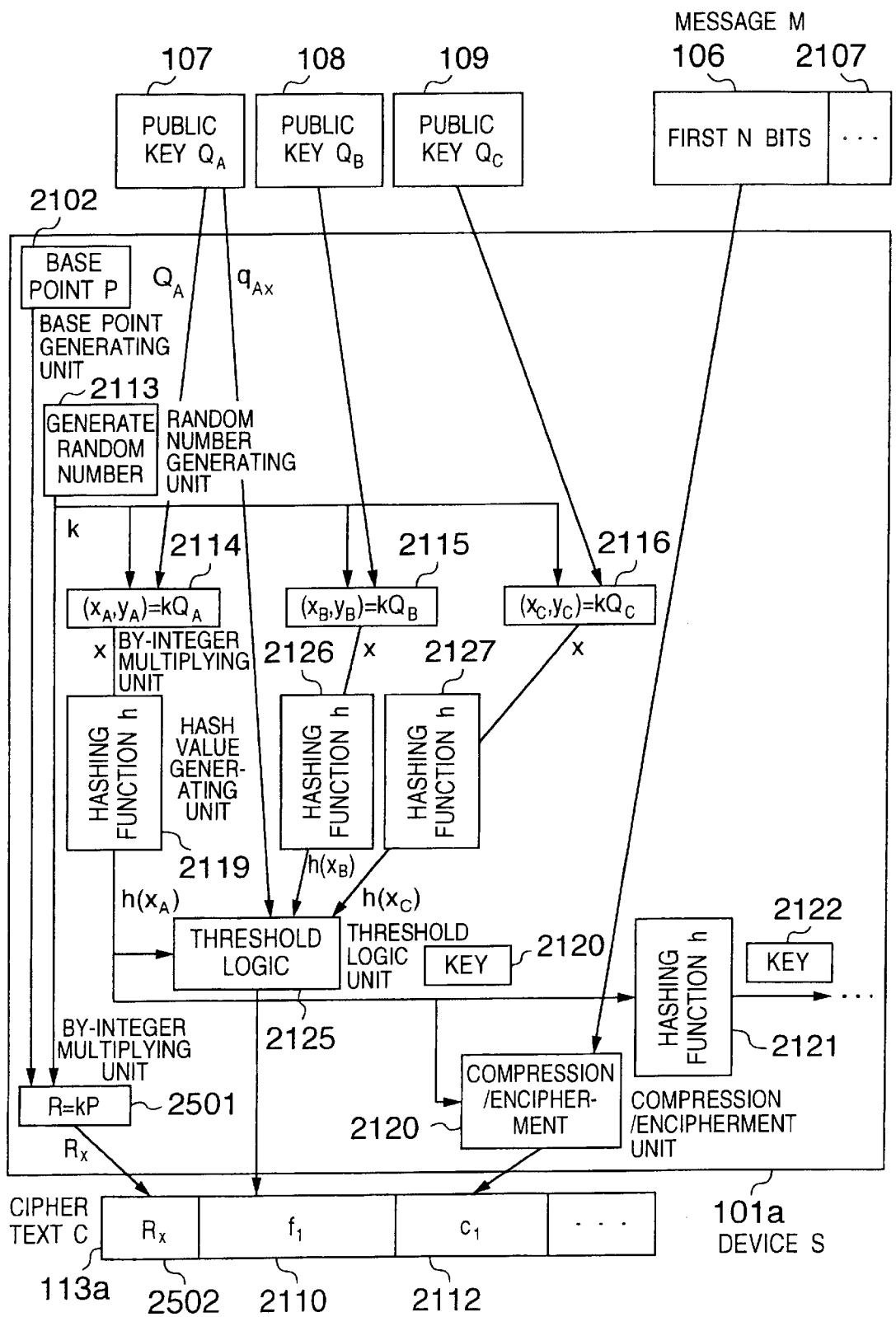
FIG. 10 is a block diagram showing the functional construction of a modified version of the data ciphering device S 101 shown in FIG. 1.

FIG. 10 shows in block diagram the functional construction of a modified version of the device S as a data ciphering device shown in FIG. 1.

In FIG. 10, the same components as those in FIG. 2 are denoted by the same reference numerals as those used in FIG. 2.

A device S 101a shown in FIG. 10 is different from the device S 101 of FIG. 2 in that a by-integer multiplying unit 2501 is used in lieu of the by-integer multiplying unit 2123. The other construction is the same as that shown in FIG. 2.

The by-integer multiplying unit 2501 is the same as the by-integer multiplying unit 2123 of FIG. 2 in that the unit receives a base point P 2102 and a random number k generated by a random number generating unit 2113 to perform a processing represented by R=kP. However, the former is different from the latter in that the former outputs only an x-coordinate value Rx 2502.

Accordingly, in the device S 101a shown in FIG. 10, the data RX 2502 forms the first data of a cipher text C 113a.

In the device S 101a shown in FIG. 10, the length of a generated cipher text becomes somewhat short as compared with that in the device S 101 shown in FIG. 2.

Namely, in the device S 101 shown in FIG. 2, the by-integer multiplying unit 2123 determines the point R (=kP) on the elliptic curve and outputs both the x-coordinate and y-coordinate values $R_X$ and $R_Y$ of the determined R so that they are taken as the first data R 2109 of the cipher text C 113.

On the other hand, in the device S 101a shown in FIG. 10, the by-integer multiplying unit 2501 determines the point R (=kP) on the elliptic curve and outputs only the x-coordinate value $R_X$ of the determined R so that they are taken as the first data $R_X$ 2502 of the cipher text C 113a.

Accordingly, the cipher text C 113a generated by the device S 101a shown in FIG. 10 is short by a length corresponding to the data of the y-coordinate value $R_Y$, as compared with the cipher text C 113 generated by the device S 101 shown in FIG. 2.

Figure 11:
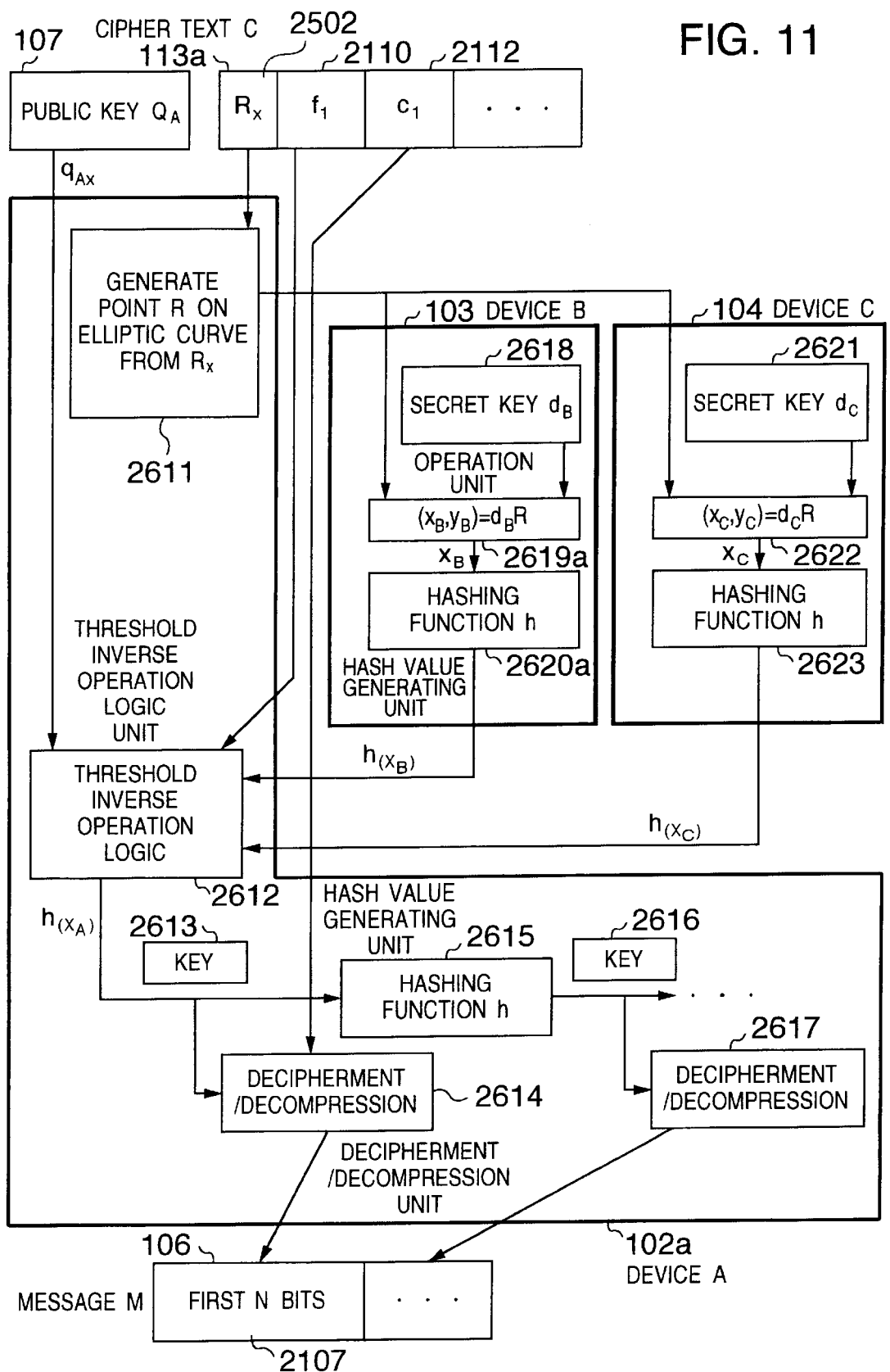
FIG. 11 is a block diagram showing the functional construction of a modified version of the data deciphering device A 102 shown in FIG. 1 in the case where a cipher text C 113a generated by the data ciphering device S 101 shown in FIG. 10 is deciphered by the device A 102 in cooperation with the devices B 103 and C 104 when the device A 102 has lost the key $d_A$ 110.

FIG. 11 shows in block diagram the functional construction of a modified version of the device A as a data deciphering device shown in FIG. 1 when the device A cooperates with the devices B and C to decipher the cipher text C 113a generated by the device S shown in FIG. 10 in the case where the device A has lost the secret key $d_A$ 110.

In Fig, 11, the same components as those in FIG. 7 are denoted by the same reference numerals as those used in FIG. 7.

A device A 102a shown in FIG. 11 is different from the device A 102 of FIG. 7 in that an operation unit 2611 is provided.

The operation unit 2611 determines a y-coordinate value $R_Y$ satisfying the following elliptic curve equation for the first data $R_X$ 2502 of the cipher text C 113a:

$$R_Y{}^2 = R_X{}^3 + a \cdot R_X + b.$$

Usually, this equation has two solutions $R_Y$. Provided that one of the two solutions is r, the other solution is -r. (But, in the case where $y^2+xy=x^3+ax+b$ is used as an elliptic curve, one solution is r while the other solution $R_X+r$.) The operation unit 2611 takes any one of the two solutions and neglects the other solution. In the shown example, r is taken so that R=($R_X$, r) is transmitted to the devices B 103 and C 104.

In the devices B 103 and C 104, therefore, hash values $h(x_B)$ and $h(x_C)$ are generated on the basis of R=($R_X$, r).

The hash values $h(x_B)$ and $h(x_C)$ have the following characteristics.

Suppose that data sent to the devices B 103 and C 104 is not R=($R_X$, r) but R'=($R_X$, -r).

In this case, an operation unit 2619a of the device B 103 will perform the calculation of ($x_B'$, $y_B'$)=$d_B$R'.

However, there results in ($x_B'$, $y_B'$)=($x_B$, $y_B$) from the property of operation on an elliptic curve.

Namely, in an operation using an elliptic curve of $y^2=x^3+ax+b$, the relation of -(x, y)=(x, -y) is satisfied. At this time, provided that ($x_B$, $y_B$)=$d_B$($R_X$, r), there results in $$d_B(R_X, -r) = d_B(-(R_X, r)) = -d_B(R_X, r) = (x_B, -y_B).$$

Also, in an operation using an elliptic curve of $y^2+xy=x^3+ax+b$, the relation of -(x, y)=(x, x+y) is satisfied. At this time, provided that ($x_B$, $y_B$)=$d_B$($R_X$, r), there results in $$d_B(R_X, R_X+r) = d_B(-(R_X, r)) = -d_B(R_X, r) = (x_B, x_B+y_B).$$

Accordingly, there results in $h(x_B')=h(x_B)$.

In other words, the hash value $h(x_B)$ outputted by the device B 103 has no change whichever of R=($R_X$, r) and R'=($R_X$, -r) is inputted.

Similarly, the hash value $h(x_C)$ outputted by the device C 104 too has no change whichever of R=($R_X$, r) and R'=($R_X$, -r) is inputted.

Accordingly, the key recovery system of the present invention can be realized even in the case where notwithstanding that there are two solutions $R_Y$ as the solution of the equation to be determined by the operation unit 2611 of the device A 102, the device A 102a transmits only any one of the two solutions $R_Y$ to the devices B 103 and C 104.

Further, in the present embodiment, there may be employed a construction in which at least one of the secret keys $d_A$ 110, $d_B$ 111 and $d_C$ 112 paired with the public keys $Q_A$ 107, $Q_B$ 108 and $Q_C$ 109 used in the device S 101 in FIG. 1 is divided into a plurality of parts in a form with which it is restorable through a predetermined operation such as exclusive logical sum, addition or the like and a plurality of information processors are caused to hold these divisional key parts.

In this case, at least one of the plurality of information processors can restore the secret key by performing the predetermined operation for the respective secret key parts possessed by the plurality of information processors.

Figure 12:
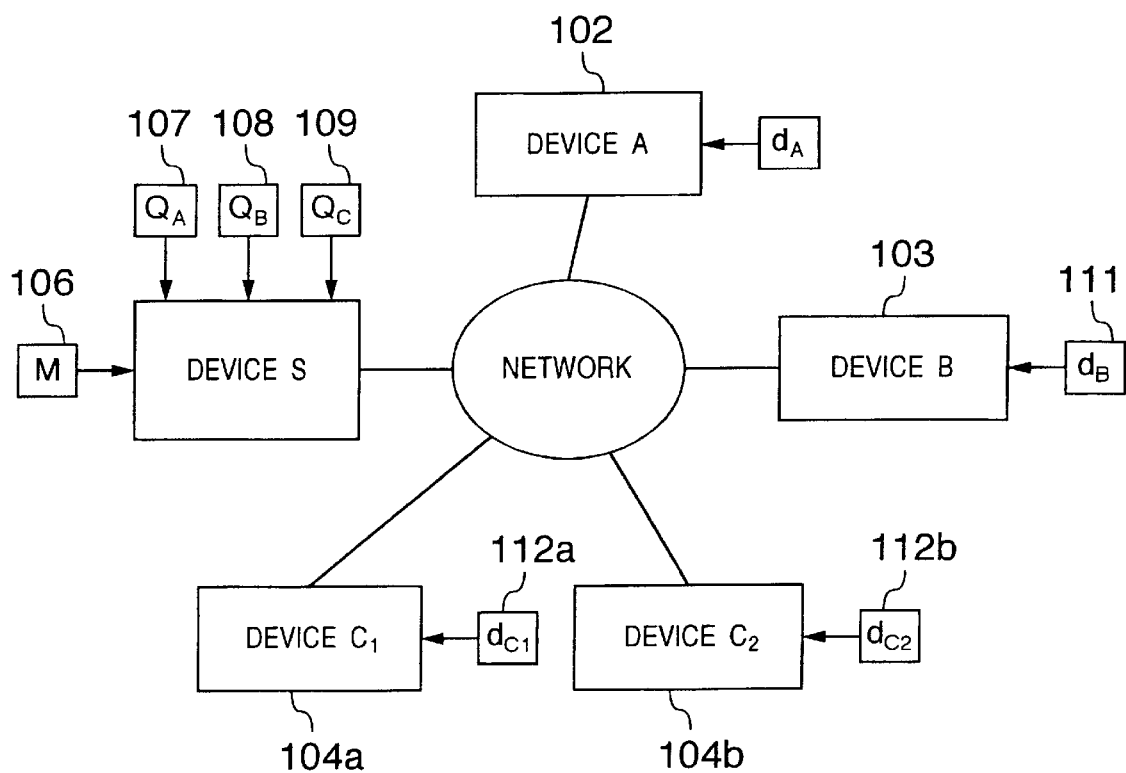
FIG. 12 is a block diagram showing the schematic construction of a key recovery system to which a modified version of the first embodiment of the present invention is applied.

FIG. 12 shows the schematic construction of a key recovery system to which a modified version of the first embodiment of the present invention is applied.

The shown example corresponds to the case where the secret key $d_C$ 112 paired with the public key $Q_C$ 109 is divided into two ($d_C1$ 112a and $d_C2$ 112b) in a form with which it is restorable through a predetermined operation such as exclusive logical sum, addition or the like, and two devices $C_1$ 104a and $C_2$ 104b are caused to hold these divisional keys.

In this case too, it is possible to recover the secret key $d_C$ 112 in such a manner that the two devices $C_1$ 104a and $C_2$ 104b cooperate with each other to perform an operational processing such as exclusive logical sum, addition or the like for the secret keys $d_C1$ 112a and $d^C2$ 112b held by the devices $C_1$ 104a and $C_2$ 104b.

A hash value $h(x_C)$ can be determined from the recovered secret key $d_C$ 112.

Further, in the present embodiment, the elliptic curve cipher based on $y^2=x^3+ax+b$ has been used. Alternatively, an elliptic curve cipher based on $y^2+xy=x^3+ax+b$ may be used.

In the foregoing, the description has been made of the first embodiment of the present invention in which three public keys are used. However, it will be understood that the key recovery can similarly be made even in the case where two public keys are used. Key managing facilities or key supervisors corresponding to the devices B and C may be one in number and the device A desiring the key recovery can select any one of the devices B and C in addition to the device S as a data acquisitee.

Figure 13:
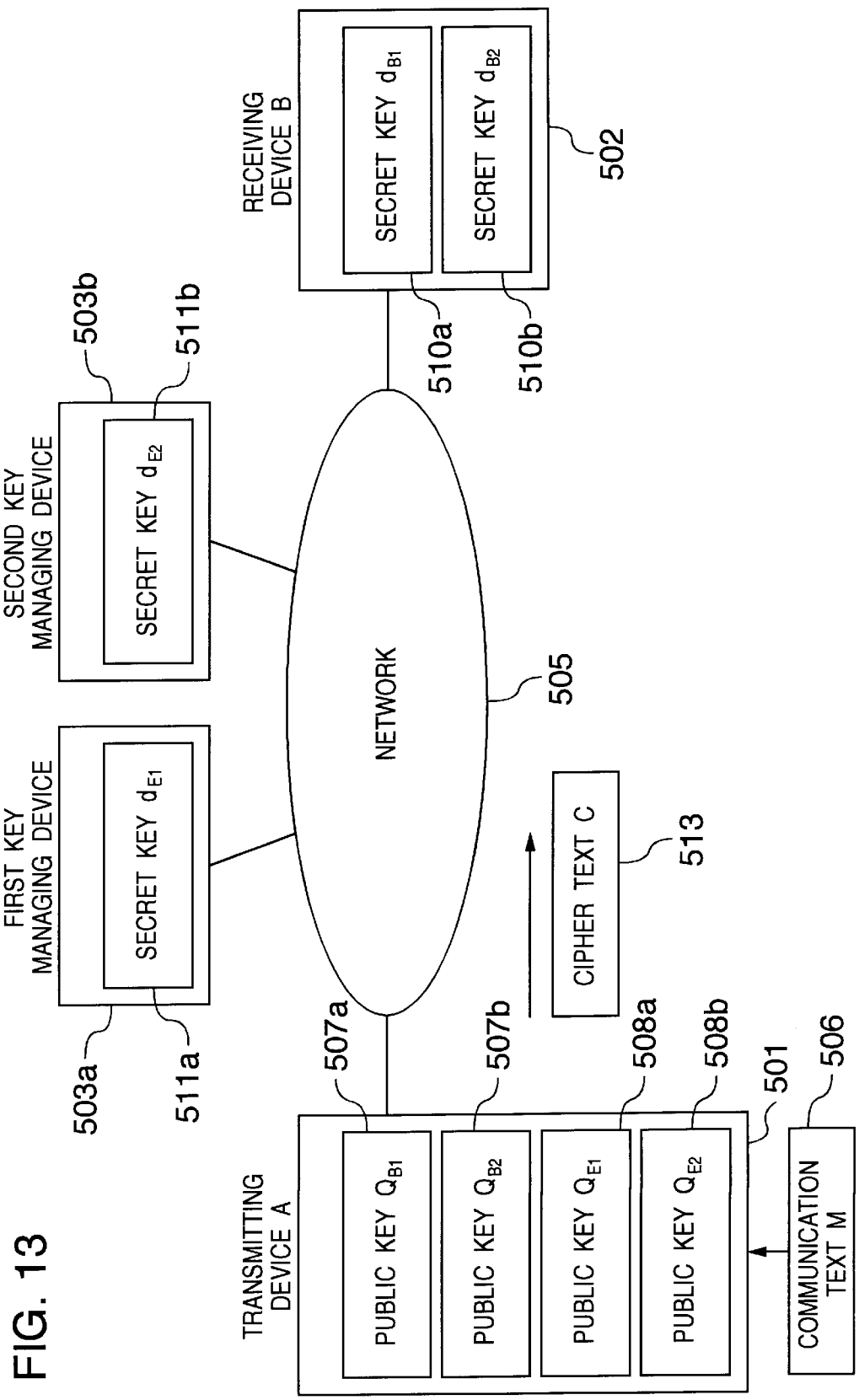
FIG. 13 is a block diagram showing the schematic construction of a key recovery system to which a second embodiment of the present invention is applied.

FIG. 13 shows in block diagram the schematic construction of a key recovery system to which a second embodiment of the present invention is applied.

In FIG. 13, a transmitting device A 501 is an information processor which is provided on the cipher data transmitting side and functions as a data ciphering device. A receiving device B 502 is an information processor which is provided on the cipher data receiving side and functions as a data deciphering device. A first key managing device 503a and a second key managing device 503b are key recovery facilities, that is, devices for recovering data ciphered by the transmitting device A 501, as required. These devices are interconnected through a network 505.

It is assumed that the transmitting device A 501 has already acquired public keys $Q_{B1}$ 507a and $Q_{B2}$ 507b paired with secret keys $d_{B1}$ 510a and $d_{B2}$ 510b possessed by the receiving device B 502, a public key $Q_{E1}$ 508a paired with a secret key $d_{E1}$ 511a possessed by the first key managing device 503a, and a public key $Q_{E2}$ 508b paired with a secret key $d_{E2}$ 511b possessed by the second key managing device 503b.

The public key $Q_{B1}$ 507a and the secret key $d_{B1}$ 510a, the public key $Q_{B2}$ 507b and the secret key $d_{B2}$ 510b, the public key $Q_{E1}$ 508a and the secret key $d_{E1}$ 511a, and the public key $Q_{E2}$ 508b and the secret key $d_{E2}$ 511b are ones in elliptic curve cipher.

Next, the brief description will be made of a processing in the case where the key recovery system in the present embodiment is applied in the construction shown in FIG. 13.

First, the description will be made of a processing performed by the transmitting device A 501 which functions as a data ciphering device.

The transmitting device A 501 ciphers a communication text or message M 506. At this time, in the case where a key having a relatively short bit length (40-bit data in the present embodiment) is used as a key for encipherment, 40-bit length data obtained by converting the public key $Q_{B1}$ 507a is used as a parameter (or key) to cipher the communication text M 506, thereby generating a cipher text C 513. The generated cipher text C 513 is transmitted to the receiving device B 502.

On the other hand, in the case where a key having a relatively long bit length (128-bit data in the present embodiment) is used as a key for encipherment, 128-bit length data is generated on the basis of data obtained by converting the public key $Q_{B1}$ 507a, data obtained by converting the public key $Q_{B2}$ 507b, data obtained by converting the public key $Q_{E1}$ 508a and data obtained by converting the public key $Q_{E2}$ 508b is generated and the generated 128-bit length data is used as a parameter (or key) to cipher the communication text M 506.

Also, the transmitting device A 501 generates data values $f_1$ and $f_2$ satisfying a relational expression by which if one of the respective data obtained by converting the public keys $Q_{B1}$ 507a and $Q_{B2}$ 507b and the respective data obtained by converting the public keys $Q_{E1}$ 508a and $QE_2$ 508b are decided, the other data can be determined directly or indirectly.

The transmitting device A 501 applies the generated data values $f_1$ and $f_2$ to a cipher text of the communication text M 506 to generate a cipher text C 513 and then transmits the cipher text C 513 to the receiving device B 502.

Next, the brief description will be made of a processing performed by the receiving device B 502 which functions as a data deciphering device.

Receiving a cipher text C 513 sent from the transmitting device A 501, the receiving device B 502 examines whether or not the cipher text C 513 is applied with data values $f_1$ and $f_2$.

In the case where the cipher text C 513 is not applied with the data values $f_1$ and $f_2$, the data used as the parameter for generation of the cipher text or the 40-bit length data obtained by converting the public key $Q_{B1}$ 507a is generated from a secret key $d_{B1}$ 510a paired with the public key $Q_{B1}$ 507a. The cipher text C 513 is deciphered by use of the generated data to obtain the communication text M 506.

On the other hand, in the case where the cipher text C 513 is applied with the data values $f_1$ and $f_2$, the receiving device B 502 first determines, the respective data obtained by converting the public keys $Q_{B1}$ 507a and $Q_{B2}$ 507b, by use of the secret keys $d_{B1}$ 510a and $d_{B2}$ 510b possessed by the receiving device B 502 itself.

Next, the respective data obtained by converting the public keys $Q_{B1}$ 507a and $Q_{B2}$ 507b and the data values $f_1$ and $f_2$ applied with the cipher text C 513 are inputted to the relational expression used for generation of the data values $f_1$ and $f_2$ in the transmitting device A 501 to determine the respective data obtained by converting the public keys $Q_{E1}$ 508a and $Q_{E2}$ 508b.

Thereafter, the 128-bit length data used for generation of the cipher text in the transmitting device A 501 is generated on the basis of the respective data obtained by converting the public key $Q_{B1}$ 507a, the public key $Q_{B2}$ 507b, the public key $Q_{E1}$ 508a and the public key $Q_{E2}$ 508b. The cipher text C 513 is deciphered by use of the generated data to obtain the communication text M 506.

Next, the description will be made of processings performed by the first and second key managing devices 503a and 503b which function as key recovery facilities.

The first and second key managing devices 503a and 503b acquire the cipher text C 513 generated by the transmitting device A 501 and applied with the data values $f_1$ and $f_2$, as required and cooperate with each other to obtain the original communication text M 506.

For example, in the case where the first key managing device 503a acquires the cipher text C 513 applied with the data values $f_1$ and $f_2$, the first key managing device 503a first determines, the data obtained by converting the public key $Q_{E1}$ 508a, by use of a secret key $d_{E1}$ 511a possessed by the device 503a itself. Also, the first key managing device 503a requests the second key managing device 503b to send the data obtained by converting the public key $Q_{E2}$ 508b.

Receiving this request, the second key managing device 503b determines, the data obtained by converting the public key $Q_{E2}$ 508b, by use of a secret key $d_{E2}$ 511b possessed by the device 503b itself and transmits the determined data to the first key managing device 503a.

Next, in the first key managing device 503a, the respective data obtained by converting the public keys $Q_{E1}$ 508a and $Q_{E2}$ 508b and the data values $f_1$ and $f_2$ applied with the cipher text C 513 are inputted to the relational expression used for generation of the data values $f_1$ and $f_2$ in the transmitting device A 501 to determine the respective data obtained by converting the public keys $Q_{B1}$ 507a and $Q_{B2}$ 507b.

Thereafter, the 128-bit length data used for generation of the cipher text in the transmitting device A 501 is generated on the basis of the respective data obtained by converting the public key $Q_{B1}$ 507a, the public key $Q_{B2}$ 507b, the public key $Q_{E1}$ 598a and the public key $Q_{E2}$ 508b. The cipher text C 513 is deciphered by use of the generated data to obtain the message or communication text M 506.

Next, each device forming the key recovery system of the present embodiment will be described.

First, the description will be made of the transmitting device A 5101 which functions as a data ciphering device.

Figure 14:
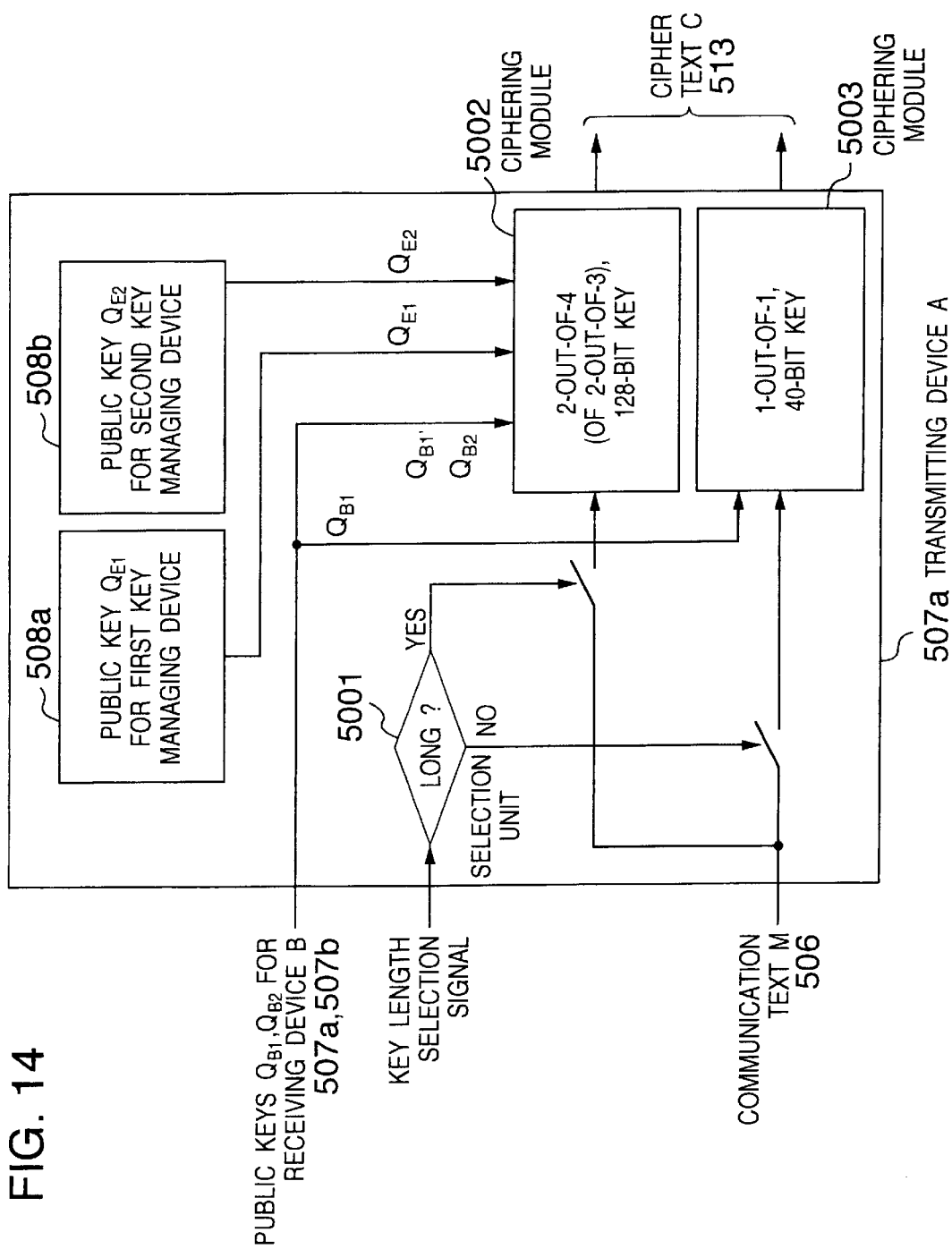
FIG. 14 is a block diagram showing the schematic construction of a receiving device A 501 shown in FIG. 13.

FIG. 14 shows in block diagram the functional construction of the transmitting device A 501 shown in FIG. 13.

The functional construction shown in FIG. 14 can be realized in such a manner that a CPU provided in an information processor such as a personal computer is caused to execute a predetermined program. This program may be stored in a storage medium such as a CD-ROM the contents of which can be read by the personal computer through a driver. Alternatively, such a program may be installed from a server into a memory on the CPU side. Also, the functional construction shown in FIG. 14 may be realized on an IC card mounted to an information processor.

In FIG. 14, a selection unit 5001 determines one of ciphering modules 5002 and 5003 as a processing module in accordance with a key length selection signal (that is, a signal for selecting either a 128-bit key or a 40-bit key as a key for ciphering the communication text M 506) inputted through the designation by a user.

In the case where the key length selection signal indicates "LONG", the communication text M 506 is inputted to the ciphering module 5002 which performs encipherment corresponding to a 2-out-of-4 decipherment logic by use of the 128-bit key. On the other hand, in the case where the key length selection signal does not indicate "LONG", the communication text M 506 is inputted to the ciphering module 5003 which performs encipherment corresponding to a 1-out-of-1 decipherment logic by use of the 40-bit key.

Figure 15:
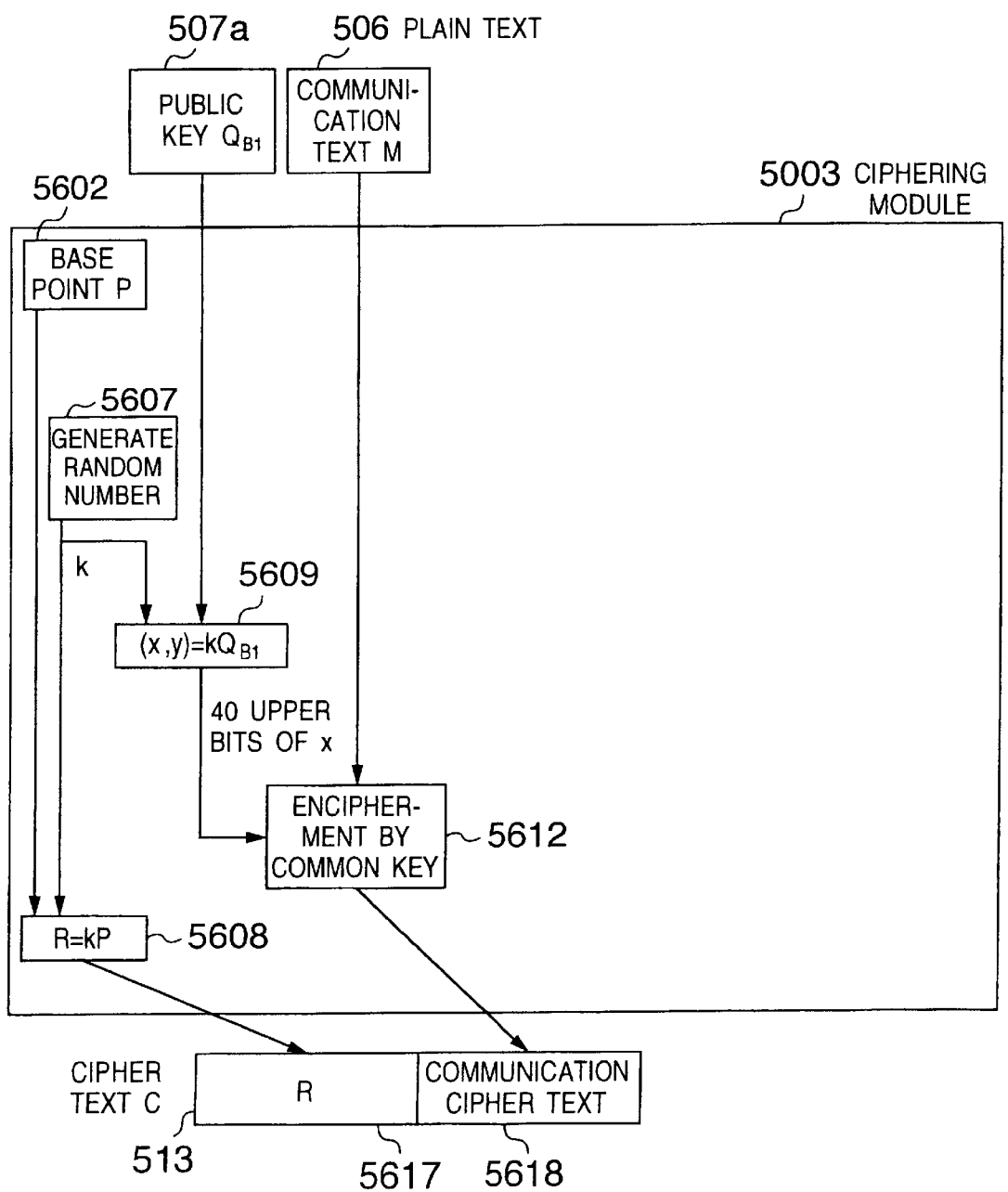
FIG. 15 is a block diagram showing the functional construction of a ciphering module 5003 for performing encipherment corresponding to a 1-out-of-1 decipherment logic by use of a 40-bit key.

FIG. 15 shows in block diagram the functional construction of the ciphering module 5003 which performs encipherment corresponding to the 1-out-of-1 decipherment logic by use of the 40-bit key.

In the ciphering module 5003 shown in FIG. 15, a base point generating unit 5602 generates a base point P which is a parameter in elliptic curve cipher. This base point P is inputted to a by-integer multiplying operation unit 5608 together with a random number k generated by a random number generating unit 5607. Receiving these inputs, the by-integer multiplying operation unit 5608 generates data R 5617 by performing a processing represented by the following equation:

$R=kP.$

This data R 5617 forms the first data of a cipher text C 513.

Also, a public key $Q_{B1}$ 507a is inputted to a by-integer multiplying operation unit 5609 together with the random number k generated by the random number generating unit 5607. Receiving these inputs, the by-integer multiplying operation unit 5609 generates a point (x, y) on the elliptic curve by performing a processing represented by the following equation:

$(x, y)=kQ_{B1}.$

A common key ciphering unit 5612 ciphers a communication text M 506, wherein 40 upper bits of x of (x, y) generated by the by-integer multiplying unit 5609 is used as a parameter (or key). Thereby, a communication cipher text 5618 is generated. This data is connected to the data R 5617 to generate the cipher text C 513.

Figure 16:
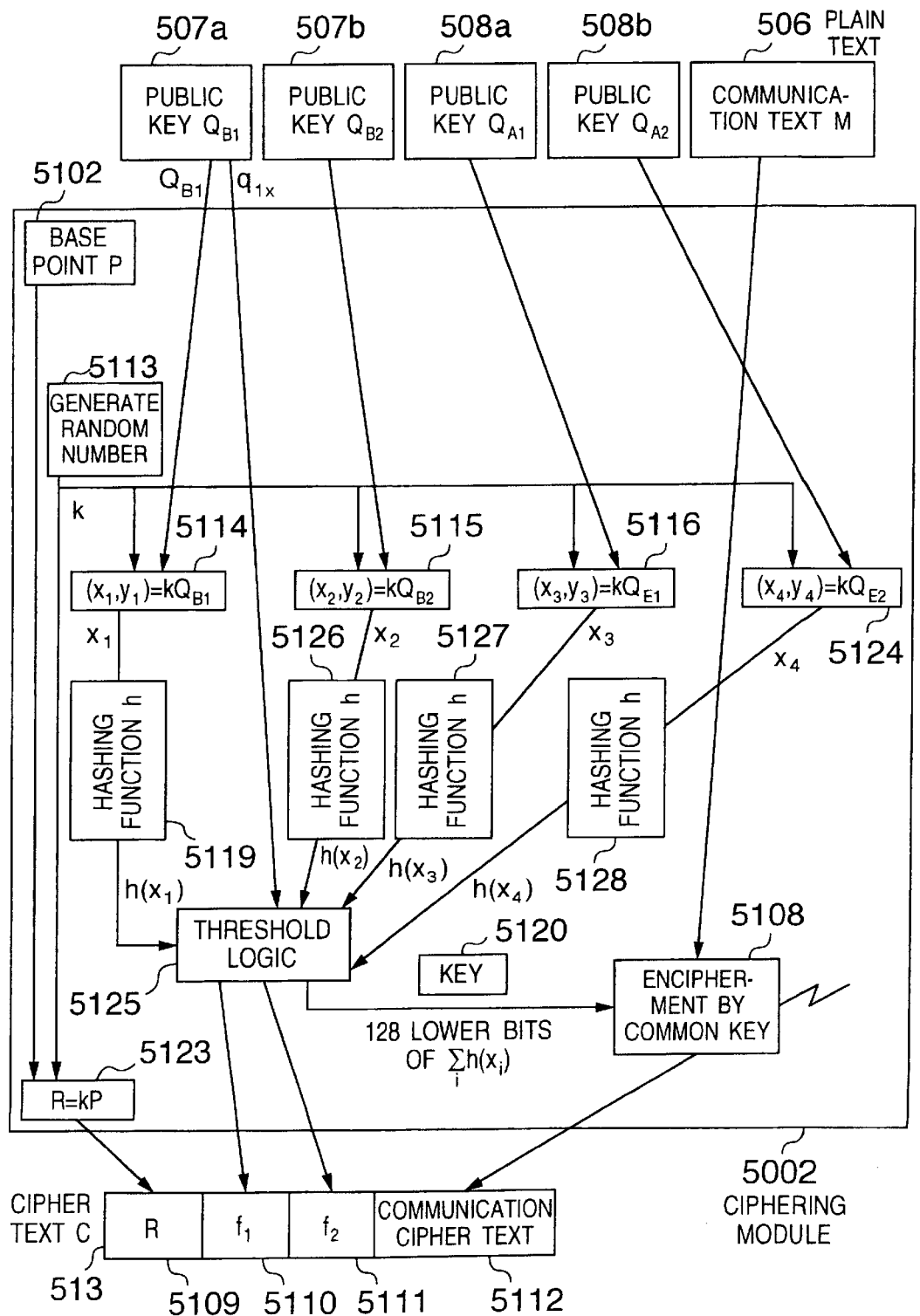
FIG. 16 is a block diagram showing the functional construction of a ciphering module 5002 for performing encipherment corresponding to a 2-out-of-4 decipherment logic by use of a 128-bit key.

FIG. 16 shows in block diagram the functional construction of the ciphering module 5002 which performs encipherment corresponding to the 2-out-of-4 decipherment logic by use of the 128-bit key.

In FIG. 16, a base point generating unit 5102 generates a base point P which is a parameter in elliptic curve cipher.

This base point P is inputted to a by-integer multiplying operation unit 5123 together with a random number k generated by a random number generating unit 5113. Receiving these inputs, the by-integer multiplying operation unit 5123 generates data R 5109 by performing a processing represented by the following equation:

$R=kP.$

This data R 5109 forms the first data of a cipher text C 513.

Also, a public key $Q_{B1}$ 507a is inputted to a by-integer multiplying operation unit 5114 together with the random number k generated by the random number generating unit 5113. Receiving these inputs, the by-integer multiplying operation unit 5114 generates a point $(x_1, y_1)$ on the elliptic curve by performing a processing represented by the following equation:

$(x_1, y_1)=kQ_{B1}.$

The numeric value $x_1$ of $(x_1, y_1)$ is thereafter inputted to a hash value generating unit 5119 and is converted thereby into a hash value $h(x_1)$.

Similarly, a public key $Q_{B2}$ 507b is inputted to a by-integer multiplying operation unit 5115 together with the random number k generated by the random number generating unit 5113. Receiving these inputs, the by-integer multiplying operation unit 5115 generates a point $(x_2, y_2)$ on the elliptic curve by performing a processing represented by the following equation:

$(x_2, y_2)=kQ_{B2}.$

The numeric value $x_2$ of $(x_2, y_2)$ is thereafter inputted to a hash value generating unit 5126 and is converted thereby into a hash value $h(x_2)$.

Similarly, a public key $Q_{E1}$ 508a is inputted to a by-integer multiplying operation unit 5116 together with the random number k generated by the random number generating unit 5113. Receiving these inputs, the by-integer multiplying operation unit 5116 generates a point $(x_3, y_3)$ on the elliptic curve by performing a processing represented by the following equation:

$(x_3, y_3)=kQ_{E1}.$

The numeric value $x_3$ of $(x_3, y_3)$ is thereafter inputted to a hash value generating unit 5127 and is converted thereby into a hash value $h(x_3)$.

Similarly, a public key $Q_{E2}$ 508b is inputted to a by-integer multiplying operation unit 5124 together with the random number k generated by the random number generating unit 5113. Receiving these inputs, the by-integer multiplying operation unit 5124 generates a point $(x_4, y_4)$ on the elliptic curve by performing a processing represented by the following equation:

$(x_4, y_4)=kQ_{E2}.$

The numeric value $x_4$ of $(x_4, y_4)$ is thereafter inputted to a hash value generating unit 5128 and is converted thereby into a hash value $h(x_4)$.

A threshold logic unit 5125 generates values $f_1$ 5110 and $f_2$ 5111 satisfying a relational expression by which if any two values of the four hash values $h(x_1)$, $h(x_2)$, $h(x_3)$ and $h(x_4)$ generated by the hash value generating units 5119, 5126, 5127 and 5128 are decided, the remaining two hash values can be determined. These values $f_1$ 5110 and $f_2$ 5111 form the second and third data of the cipher text C 513, respectively. The details of the threshold logic unit 5125 will be described later on.

A key generating unit 5120 generates a key for encipherment of a communication text M 506 by use of 128 lower bits of the summation of the hash values $h(x_1)$, $h(x_2)$, $h(x_3)$ and $h(x_4)$ generated by the hash value generating units 5119, 5126, 5127 and 5128.

A common key ciphering unit 5108 ciphers a communication text M 506 by use of the 128-bit key generated by the key generating unit 5120. Thereby, a communication cipher text 5112 is generated. This data is connected to the data $f_1$ 5111 to generate the cipher text C 513.

Next, the description will be made of the threshold logic unit 5125 shown in FIG. 16.

As mentioned above, the threshold logic unit 5125 generates the values $f_1$ 5110 and $f_2$ 5111 satisfying a relational expression by which if any two values of the four hash values $h(x_1)$, $h(x_2)$, $h(x_3)$ and $h(x_4)$ are decided, the remaining two hash values can be determined.

Figure 17:
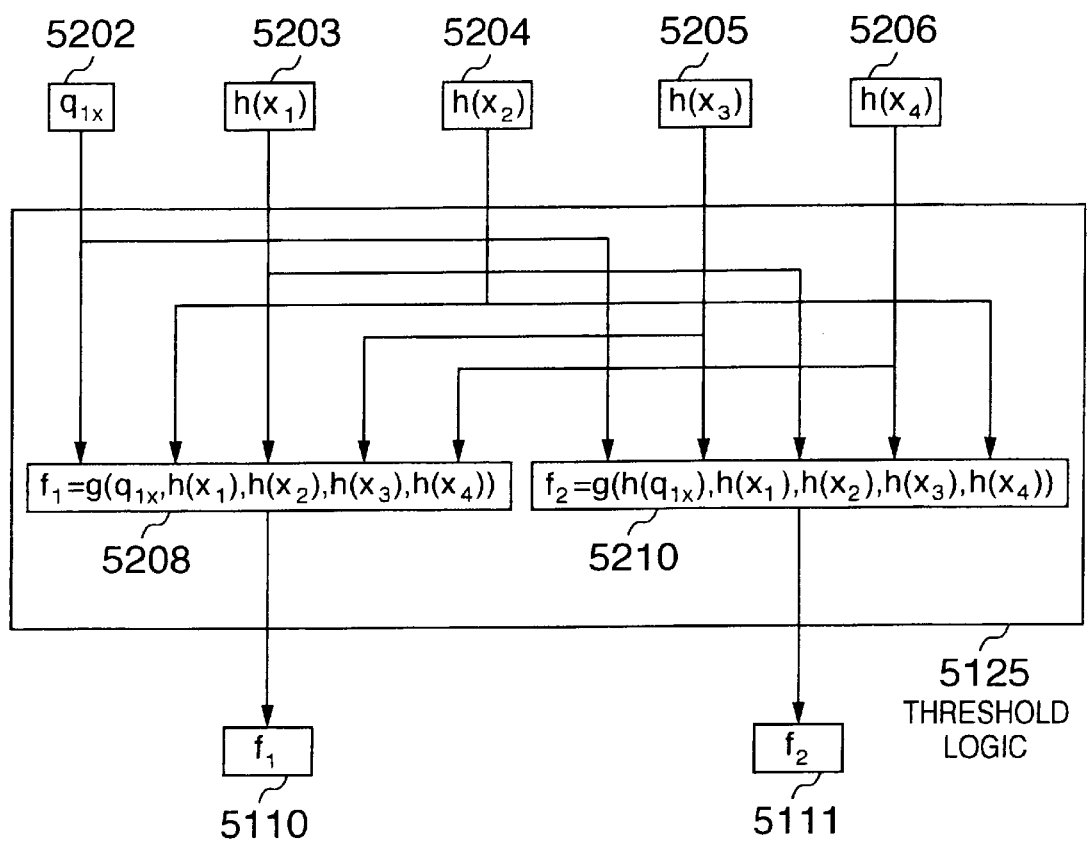
FIG. 17 is a block diagram showing the functional construction of a threshold logic unit 5125 shown in FIG. 16.

FIG. 17 shows in block diagram the functional construction of the threshold logic unit 5125 shown in FIG. 16.

As shown in FIG. 17, the threshold logic unit 5125 is inputted with five data $q_{1X}$ 5202, $h(x_1)$ 5203, $h(x_2)$ 5204, $h(x_3)$ 52205 and $h(x_4)$ 5206 wherein $q_{1X}$ 2202 is the x-coordinate value of the public key $Q_{B1}$ 507$_a$ in FIG. 16, and $h(x_1)$ 5203, $h(x_2)$ 5204, $h(x_3)$ 52205 and $h(x_4)$ 5206 are the hash values generated by the hash value generating units 5119, 5126, 5127 and 5128, respectively.

An operation unit 5208 generates data $f_1$ 5110 by performing a processing represented by the following equation:

$$f_1 = g(q_{1X}, h(x_1), h(x_2), h(x_3), h(x_4)).$$

Also, an operation unit 5210 generates data $f_2$ 5111 by performing a processing represented by the following equation:

$$f_2 g(h(q_{1X}), h(x_1), h(x_2), h(x_3), h(x_4)).$$

In the above equations of $f_1$ and $f_2$, the function g is defined by $$g(x, a_1, a_2, a_3, a_4) = a_1 + a_2 \cdot x + a_3 \cdot x^2 + a_4 \cdot x^3 \pmod{n}.$$

Accordingly, the data $f_1$ and $f_2$ satisfy the following quadruple simultaneous equation for $q_{1X}$, $h(x_1)$, $h(x_2)$, $h(x_3)$ and $h(x_4)$:

$$f_1 = h(x_1) + h(x_2) \cdot q_{1X} + h(x_3) \cdot q_{1X}^2 + h(x_4) \cdot q_{1X}^3 \pmod{n}$$

$$f_2 = h(x_1) + h(x_2) \cdot h(q_{1X}) + h(x_3) \cdot h(q_{1X})^2 + h(x_4) \cdot h(q_{1X})^3 \pmod{n}.$$

Accordingly, in the case where the values of $f_1$, $f_2$ and $q_{1X}$ have already been known, it is apparent from the above equation that if any two values among $h(x_1)$, $h(x_2)$, $h(x_3)$ and $h(x_4)$ are decided, the remaining two values can be determined (since there results in a simultaneous equation in which the number of unknown quantities is two and the number of equations is two).

In the above encipherment, three hash values may be used in lieu of four hash values to generate the value $f_1$ satisfying a relational expression by which if any two values among the three hash values are decided, the remaining one hash value can be determined. This can be realized by causing the ciphering module 5002 to have a ciphering function corresponding to a 2-out-of-3 decipherment logic. In this case, a deciphering module 5902 in FIG. 18 (which will be mentioned later on) is provided with the 2-out-of-3 decipherment logic. It is obvious that such a modified version corresponds to the first embodiment.

Next, the description will be made of the receiving device B 502 which functions as a data deciphering device.

Figure 18:
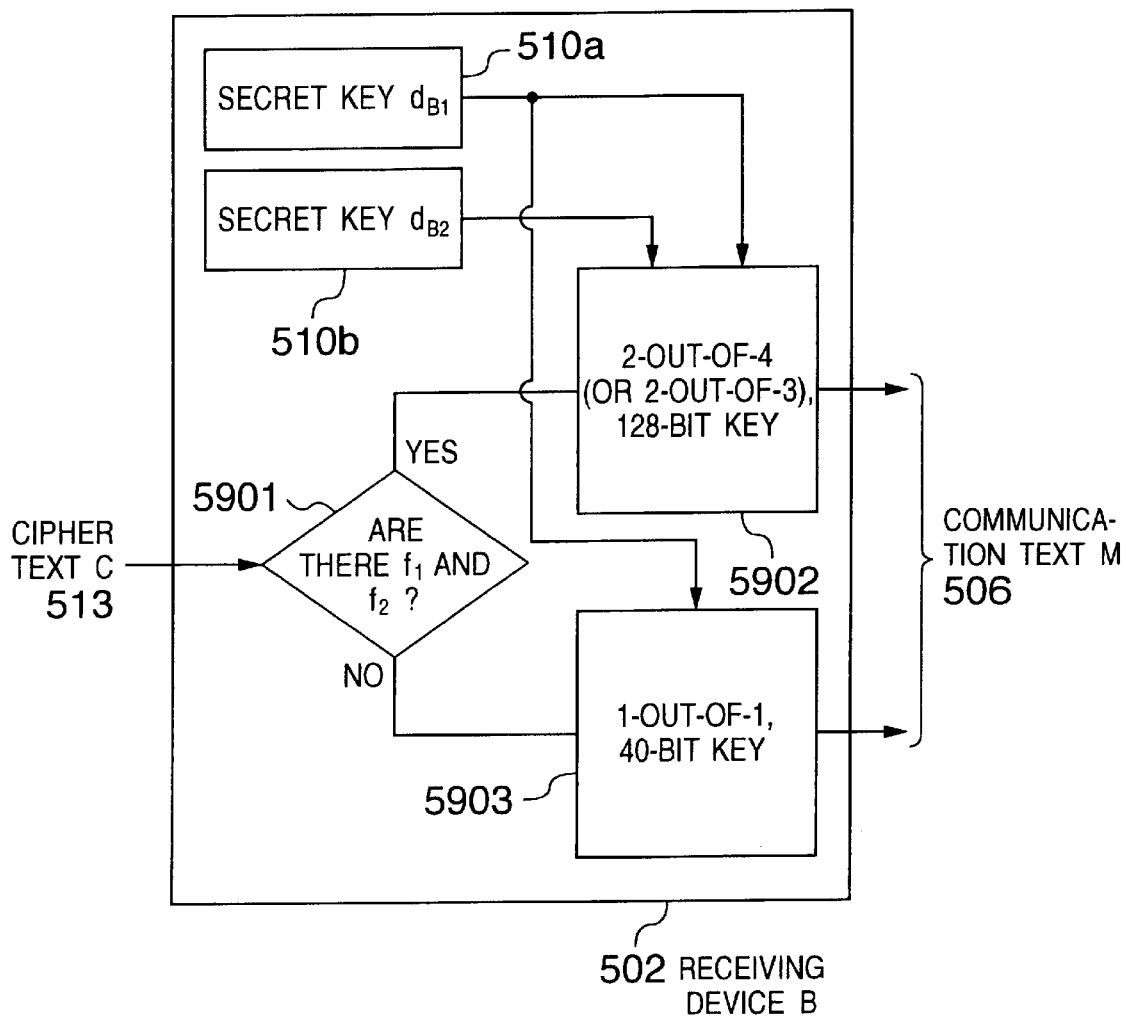
FIG. 18 is a block diagram showing the functional construction of a receiving device B 502 shown in FIG. 13.

FIG. 18 shows in block diagram the functional construction of the receiving device B 502 shown in FIG. 13.

The functional construction shown in FIG. 18 can be realized in such a manner that a CPU provided in an information processor such as a personal computer is caused to execute a predetermined program. This program may be stored in a storage medium such as a CD-ROM the contents of which can be read by the personal computer through a driver. Alternatively, such a program may be installed from a server into a memory on the CPU side. Also, the functional construction shown in FIG. 18 may be realized on an IC card mounted to an information processor.

In FIG. 18, a selection unit 5901 determines either a deciphering module 5902 or 5903 which a received cipher text C 513 is to be inputted. The determination is made in accordance with the cipher text C 513 is applied with data values $f_1$ and $f_2$.

In the case where the cipher text C 513 is applied with the data values $f_1$ and $f_2$, the cipher text C 513 is inputted to the deciphering module 5902 which performs 2-out-of-4 decipherment by use of a 128-bit key. On the other hand, in the case where the cipher text C 513 is not applied with the data values $f_1$ and $f_2$, the cipher text C 513 is inputted to the deciphering module 5903 which performs 1-out-of-1 decipherment by use of a 40-bit key.

Figure 19:
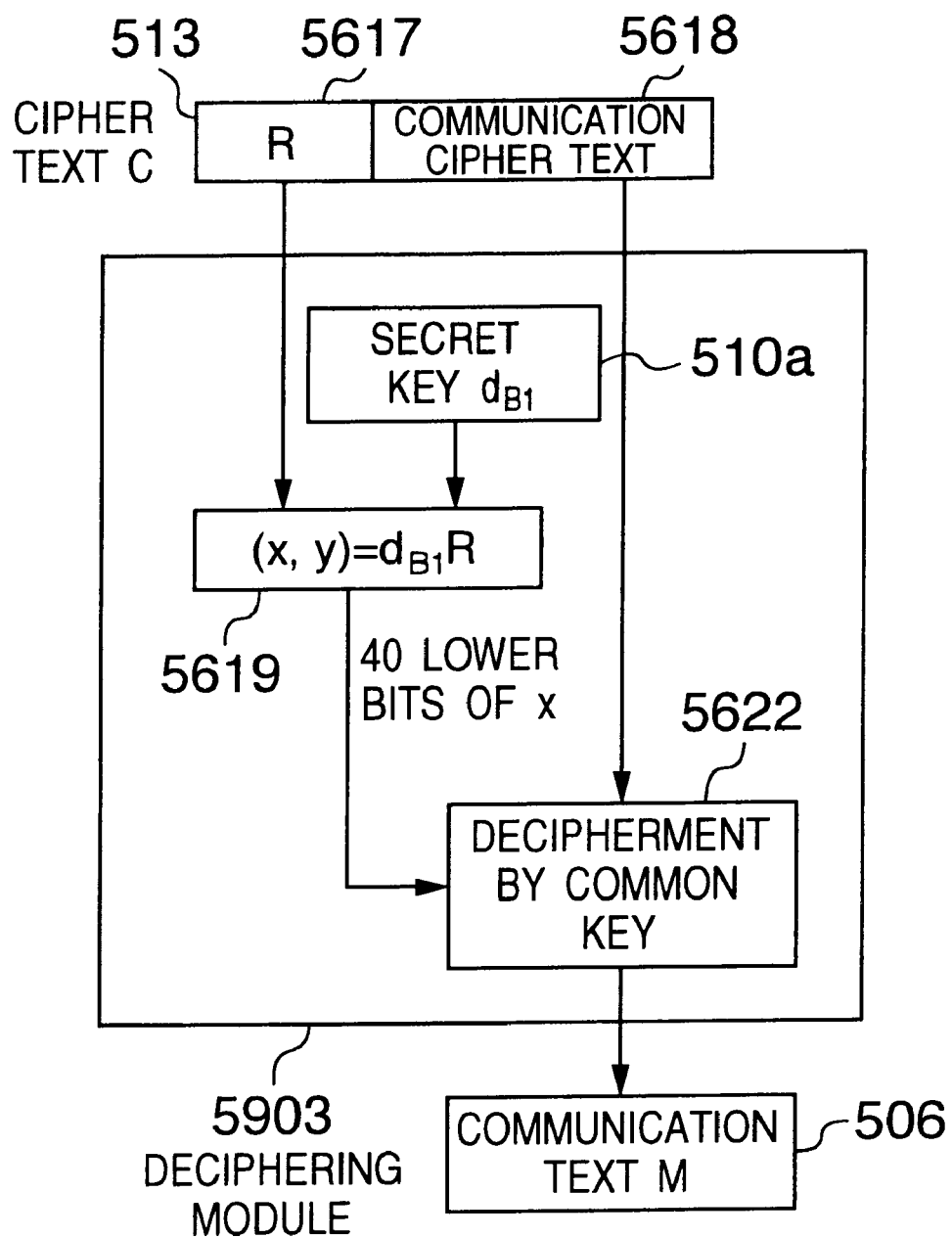
FIG. 19 is a block diagram showing the functional construction of a deciphering module 5903 for performing 1-out-of-1 decipherment by use of a 40-bit key.

FIG. 19 shows in block diagram the functional construction of the deciphering module 5903 which performs the 1-out-of-1 decipherment by use of the 40-bit key.

In FIG. 19, when the cipher text C 513 is inputted, an operation unit 5619 reads a secret key $d_{B1}$ 510$a$ which is stored in the module 5903 itself and is paired with the public key $Q_{B1}$ 507$a$. And, the operation unit 5619 determines a point (x, y) on an elliptic curve which satisfies the following equation between the read secret key $d_{B1}$ 510$a$ and the first data R 5617 of the cipher text C 513:

$$(x, y) = d_{B1} R.$$

This determined point (x, y) on the elliptic curve coincides with the point (x, y) on the elliptic curve determined by the operation unit 5609 shown in FIG. 15. The reason has already been mentioned in conjunction with the first embodiment.

A common key deciphering unit 5622 deciphers a communication cipher text 5618 while 40 upper bits of x of (x, y) determined by the operation unit 5619 is used as a parameter (or key). Thereby, the original communication text M 506 is obtained.

Figure 20:
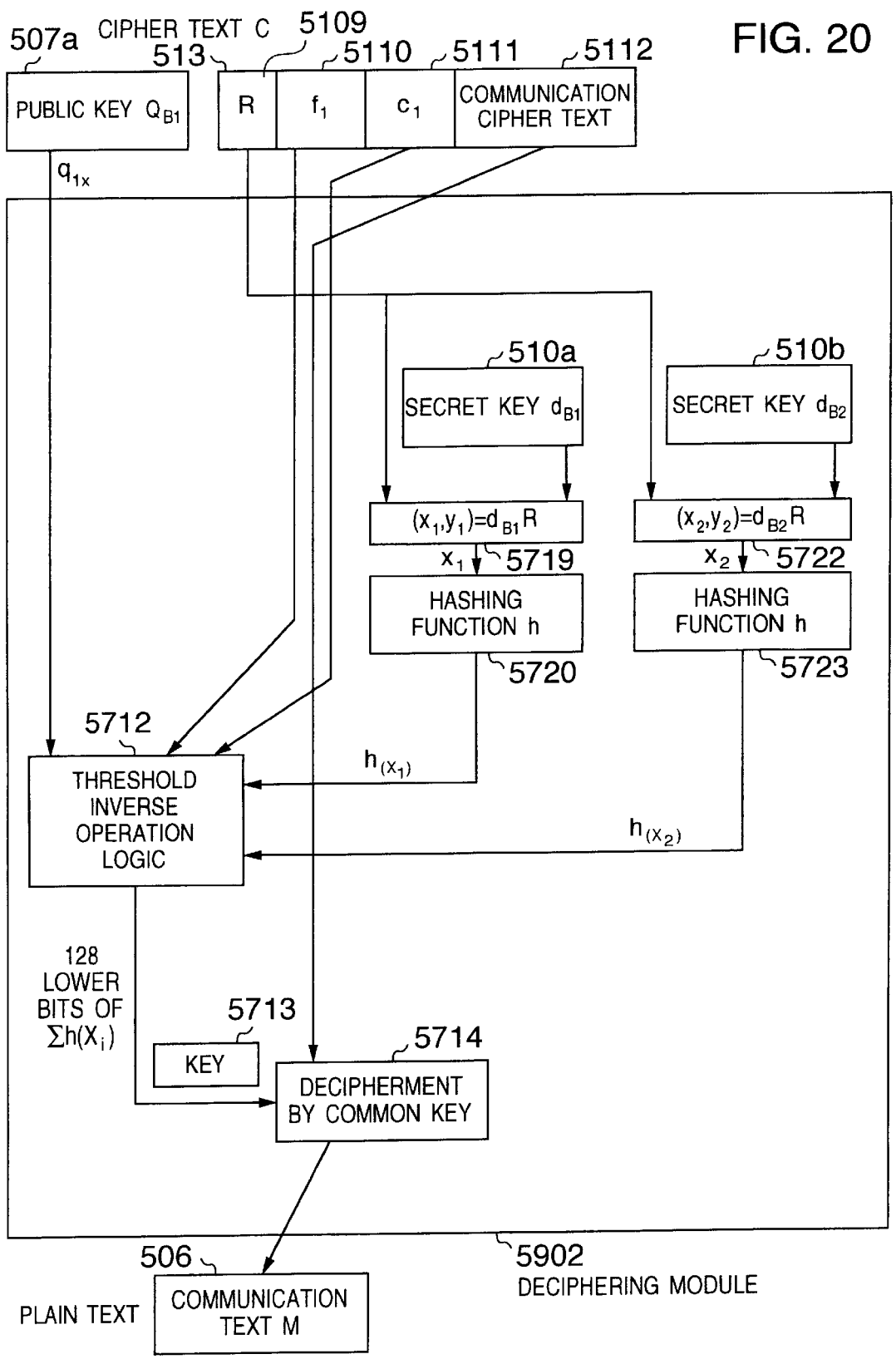
FIG. 20 is a block diagram showing the functional construction of a deciphering module 5902 for performing 2-out-of-4 decipherment by use of a 128-bit key.

FIG. 20 shows in block diagram the functional construction of the deciphering module 5902 which performs the 2-out-of-4 decipherment by use of the 128-bit key.

In FIG. 20, when the cipher text C 513 is inputted, an operation unit 5719 reads a secret key $d_{B1}$ 510$a$ which is stored in the module 5902 itself and is paired with the public key $Q_{B1}$ 507$a$. And, the operation unit 5719 determines a point $(x_1, y_1)$ on an elliptic curve which satisfies the following equation between the read secret key $d_{B1}$ 510$a$ and the first data R 5617 of the cipher text C 513:

$$(x_1, y_1) = d_{B1}R.$$

Thereafter, a hash value generating unit 5720 generates a hash value $h(x_1)$ for the x-coordinate value $x_1$ of $(x_1, y_1)$ determined by the operation unit 5719.

Similarly, an operation unit 5722 reads a secret key $d_{B2}$ 510*b* which is stored in the module 5902 itself and is paired with the public key $Q_{B2}$ 507*b*. And, the operation unit 5722 determines a point $(x_2, y_2)$ on the elliptic curve which satisfies the following equation between the read secret key $d_{B2}$ 510*b* and the first data R 5109 of the cipher text C 513:

$$(x_2, y_2) = d_{B2}R.$$

Thereafter, a hash value generating unit 5723 generates a hash value $h(x_2)$ for the x-coordinate value $x_2$ of $(x_2, y_2)$ determined by the operation unit 5722.

The generated hash values $h(x_1)$ and $h(x_2)$ coincide with the hash values $h(x_1)$ and $h(x_2)$ generated by the hash value generating units 5119 and 5126 shown in FIG. 16, respectively. The reason has already been mentioned in conjunction with the first embodiment.

A threshold inverse operation logic unit 5712 receives the hash values $h(x_1)$ and $h(x_2)$ generated by the hash value generating units 5720 and 5723, the x-coordinate value $q_{1X}$ of the public key $Q_{B1}$ 507*a* and the second and third data $f_1$ 5110 and $f_2$ 5111 of the cipher text C 513 and generate $h(x_3)$ and $h(x_4)$ satisfying the following equation:

$$f_1 = h(x_1) + h(x_2) \cdot q_{1X} + h(x_3) \cdot q_{1X}^2 + h(x_4) \cdot q_{1X}^3 \pmod{n}$$

$$f_2 = h(x_1) + h(x_2) \cdot h(q_{1X}) + h(x_3) \cdot h(q_{1X})^2 + h(x_4) \cdot h(q_{1X})^3 \pmod{n}.$$

The above equation corresponds to the case where $h(x_1)$ and $h(x_2)$ have already been known among the hash values $h(x_1)$, $h(x_2)$, $h(x_3)$ and $h(x_4)$ respectively generated by the hash value generating units 5119, 5126, 5127 and 5128 shown in FIG. 16.

As mentioned above, the hash values $h(x_1)$ and $h(x_2)$ respectively generated by the hash value generating units 5720 and 5723 shown in FIG. 20 coincide with the hash values $h(x_1)$ and $h(x_2)$ respectively generated by the hash value generating units 5119 and 5126 shown in FIG. 16. Accordingly, there results in that $h(x_3)$ and $h(x_4)$ determined in accordance with the above equation coincide with the hash values $h(x_3)$ and $h(x_4)$ generated by the hash value generating units 5127 and 5128 shown in FIG. 16.

A key generating unit 5713 generates, as a key for decipherment of a communication cipher text 5112, 128 lower bits of the summation of the hash values $h(x_1)$ and $h(x_2)$ generated by the hash value generating units 5520 and 5723 and the hash values $h(x_3)$ and $h(x_4)$ determined by the threshold inverse logic unit 5712.

A common key deciphering unit 5714 deciphers the communication cipher text 5112 by use of the 128-bit key generated by the key generating unit 5713. Thereby, the original communication text M 506 is obtained.

Next, description will be made of the first and second key managing devices 503*a* and 503*b* which function as the key recovery facilities.

As mentioned above, any one of the first and second key managing devices 503*a* and 503*b* acquires the cipher text C 513 ciphered in the transmitting device A 501 by use of the 128-bit key, as required, and cooperate with the other managing device to decipher the cipher text, thereby obtaining the original communication text M 506.

Herein, the description will be made taking, by way of example, the case where the first key managing device 503*a* acquires the cipher text C 513.

Figure 21:
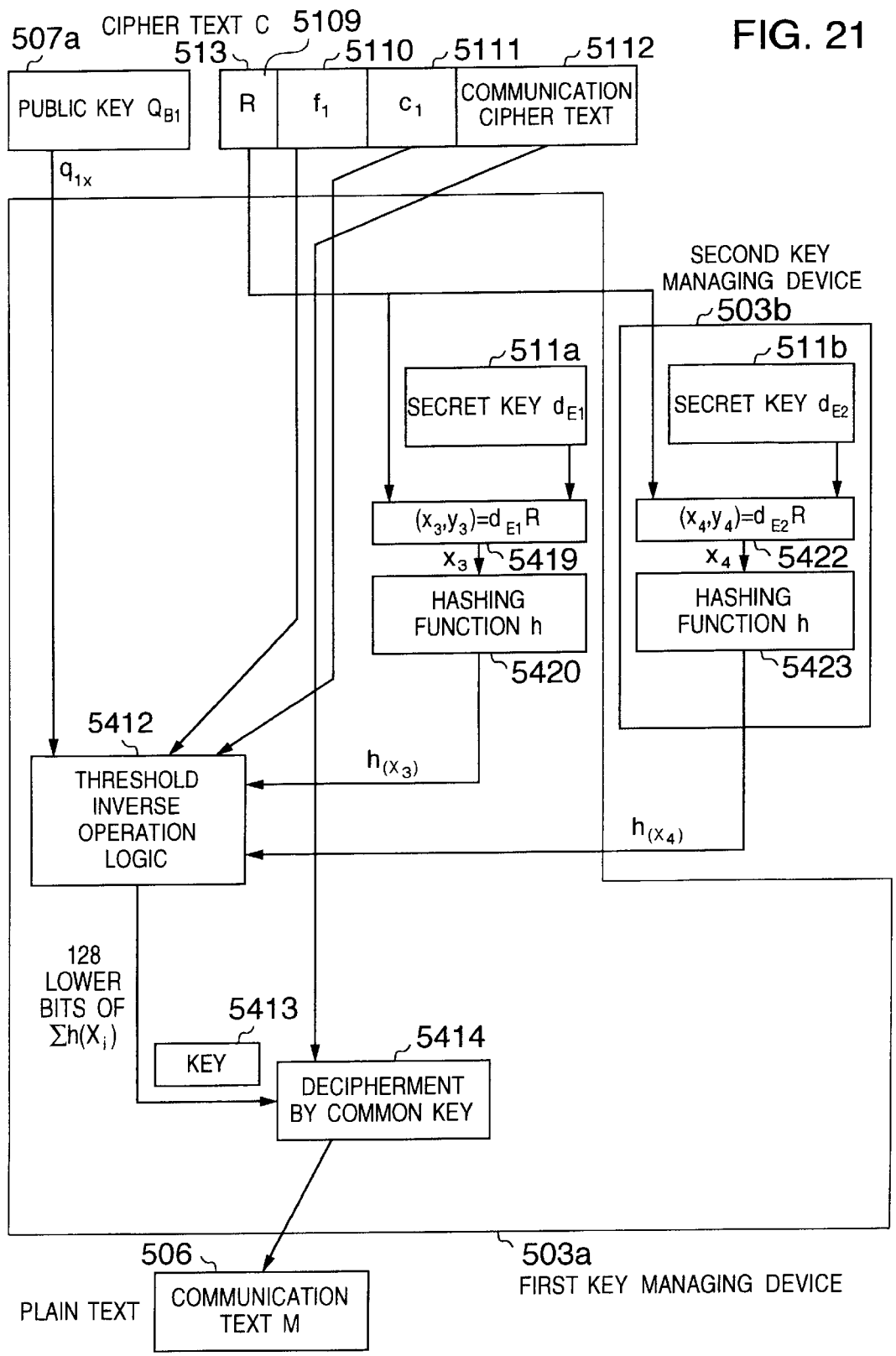
FIG. 21 is a block diagram showing the functional construction of first and second key managing devices 503a and 503b.

FIG. 21 shows in block diagram the functional construction of the first and second key managing devices 503*a* and 503*b*.

In FIG. 21, when a cipher text C513 is inputted, the first key managing device 503*a* informs the second key managing device 503*b* of the first data R 5109 of the cipher text C 513. Receiving this information, an operation unit 5422 of the second key managing device 503*b* reads a secret key $d_{E2}$ 511*b* possessed by the device 503*b* itself and paired with a public key $Q_{E2}$ 508*b*. And, the operation unit 5422 determines a point $(x_4, y_4)$ on an elliptic curve satisfying the following equation between the secret key $d_{E2}$ 511*b* and the first data R 5109 of the cipher text C 513:

$$(x_4, y_4) = d_{E2}R.$$

Thereafter, a hash value generating unit 5423 generates a hash value $h(x_4)$ for the x-coordinate value $x_4$ of $(x_4, y_4)$ determined by the operation unit 5422. The first key managing device 503*a* is informed of the generated hash value $h(x_4)$.

In the first key managing device 503*a*, on the other hand, an operation unit 5419 reads a secret key $d_{E1}$ 5111*a* possessed by the device 503*a* itself and paired with a public key $Q_{E1}$ 508*a*. And, the operation unit 5419 determines a point $(x_3, y_3)$ on the elliptic curve satisfying the following equation between the secret key $d_{E1}$ 511*a* and the first data R 5109 of the cipher text C 513:

$$(x_3, y_3) = d_{E1}R.$$

Thereafter, a hash value generating unit 5420 generates a hash value $h(x_3)$ for the x-coordinate value $x_3$ of $(x_3, y_3)$ determined by the operation unit 5419.

The generated hash values $h(x_3)$ and $h(x_4)$ coincide with the hash values $h(x_3)$ and $h(x_4)$ generated by the hash value generating units 5127 and 5128 shown in FIG. 16, respectively. The reason has already been mentioned in conjunction with the first embodiment.

A threshold inverse operation logic unit 5412 receives the hash values $h(x_3)$ and $h(x_4)$ generated by the hash value generating unit 5420 and the hash value generating unit 5423 of the second key managing device 503*b*, the x-coordinate value $q_{1X}$ of the public key $Q_{B1}$ 507*a* and the second and third data $f_1$ 5110 and $f_2$ 5111 of the cipher text C 513 and generate $h(x_1)$ and $h(x_2)$ satisfying the following equation:

$$f_1 = h(x_1) + h(x_2) \cdot q_{1X} + h(x_3) \cdot q_{1X}^2 + h(x_4) \cdot q_{1X}^3 \pmod{n}$$

$$f_2 = h(x_1) + h(x_2) \cdot h(q_{1X}) + h(x_3) \cdot h(q_{1X})^2 + h(x_4) \cdot h(q_{1X})^3 \pmod{n}.$$

The above equation corresponds to the case where $h(x_3)$ and $h(x_4)$ have already been known among the hash values $h(x_1)$, $h(x_2)$, $h(x_3)$ and $h(x_4)$ respectively generated by the hash value generating units 5119, 5126, 5127 and 5128 shown in FIG. 16.

As mentioned above, the hash values $h(x_3)$ and $h(x_4)$ respectively generated by the hash value generating units 5420 and 5423 shown in FIG. 21 coincide with the hash values $h(x_3)$ and $h(x_4)$ respectively generated by the hash value generating units 5127 and 5128 shown in FIG. 16. Accordingly, there results in that $h(x_1)$ and $h(x_2)$ determined in accordance with the above equation coincide with the hash values $h(x_1)$ and $h(x_2)$ generated by the hash value generating units 5119 and 5126 shown in FIG. 16.

A key generating unit 5413 generates, as a key for decipherment of a communication cipher text 5112, 128 lower bits of the summation of the hash values $h(x_3)$ and h($x_4$) generated by the hash value generating units 5420 and 5423 and the hash values h($x_1$) and h($x_2$) determined by the threshold inverse logic unit 5412.

A common key deciphering unit 5414 deciphers the communication cipher text 5112 by use of the 128-bit key generated by the key generating unit 5413. Thereby, the original communication text M 506 is obtained.

The second embodiment is different from the first embodiment in that, in lieu of data which is obtained by converting the public key $Q_{B1}$ (and can be determined from the secret key $d_{B1}$ possessed by the receiving device B 502), data generated on the basis of respective data obtained by the public key $Q_{B1}$, the public key $Q_{B2}$, the public key $Q_{E1}$ and the public key $Q_{E2}$ is used as the parameter for generation of the communication chipher text 5112 in the encipherment processing with the 128-bit key.

In the second embodiment, the respective data obtained by converting the public keys $Q_{B1}$ and $Q_{B2}$ can be determined in the first and second key managing devices 503a and 503b from the data values $f_1$ and $f_2$ applied to the cipher text C 513. In the first and second key managing devices 503a and 503b, the data used as the parameter for generation of the communication cipher text 5112 can be determined on the basis of the respective data obtained by converting the public keys $Q_{B1}$ and $Q_{B2}$ and determined from the data values $f_1$ and $f_2$ applied to the cipher text C 513 and the respective data obtained by converting the public keys $Q_{E1}$ and $Q_{E2}$ paired with the secret keys $d_{E1}$ and $d_{E2}$ possessed by the devices 503a and 503b themselves.

Accordingly, it is possible to decipher the cipher text without using the secret keys $d_{B1}$ and $d_{B2}$ possessed by the receiving device B 502, similarly to the first embodiment of the present invention.

In the second embodiment of the present invention, not the data obtained by converting the public key $Q_{B1}$ but the data generated on the basis of respective data obtained by the public key $Q_{B1}$, the public key $Q_{B2}$, the public key $Q_{E1}$ and the public key $Q_{E2}$ is used as the parameter (or key) for generation of the communication cipher text 5112, as mentioned above.

Accordingly, even the receiving device B 502 possessing the secret keys $d_{B1}$ and $d_{B2}$ paired with the public keys $Q_{B1}$ and $Q_{B2}$ cannot obtain data used as the parameter for generation of the communication cipher text 5112 unless the data obtained by converting the public keys $Q_{E1}$ and $Q_{E2}$ is determined from the data values $f_1$ and $f_2$ applied to the cipher text C 513.

In other words, even the receiving device B 502 cannot decipher the cipher text C 513 unless the cipher text is applied with the data values $f_1$ and $f_2$ satisfying the relational expression by which if the data obtained by converting two any public keys is decided among four data obtained by converting the public key $Q_{B1}$, the public key $Q_{B2}$, the public key $Q_{E1}$ and the public key $Q_{E2}$, respectively, the data obtained by converting two remaining public keys can be determined.

On the other hand, in the case where the data values $f_1$ and $f_2$ are applied to the cipher text, the first and second key managing devices too can decipher the cipher text certainly.

Accordingly, one preferable example of application of the second embodiment of the present invention is a key recovery system in which it is required to enable the government or the like to perform, the decipherment of ciphered confidential data or the like communicated crossing the border, for defensive reasons or the like irrespective of data communicators' or transactors' will.

In the second embodiment, data generated on the basis of respective data obtained by converting four public keys has been used as a parameter for generation of the communication cipher text 5112. However, the present invention is not limited to such an example. The parameter for generation of the communication cipher text 5112 may be arbitrary, so long as it is generated on the basis of respective data obtained by converting two or more public keys.

In the example shown in FIG. 13, however, the receiving device and the key managing devices are requested to possess the same number of secret keys, in order that the receiving device and the key managing devices can determine, the data obtained by converting public keys other than public keys paired with secret keys possessed by the devices themselves, from the data values applied to the cipher text.

The second embodiment has been described in conjunction with the case where the first data of the cipher text C 513 includes both the x-coordinate and y-coordinate values of the point R on the elliptic curve generated by the by-integer multiplying operation unit 5608 or 5123. Similarly to the first embodiment, however, the key recovery system of the present invention can be realized even in the case where the first data of the cipher text C 513 includes only one of the x-coordinate and y-coordinate values.

Further, in the second embodiment, the elliptic curve cipher based on $y^2=x^3+ax+b$ has been used. Alternatively, an elliptic curve cipher based on $y^2+xy=x^3+ax+b$ may be used similarly to the first embodiment.

What is claimed is:

1. A key recovery method in which data obtained by converting a public key and used as a parameter at the time of generation of ciphertext is recovered without using a secret key paired with the public key, said method comprising:

generating, at a transmitting side, a data value satisfying a relational expression by which data obtained by converting a first public key and used as a parameter at the time of generation of ciphertext can be determined, if at least one subset is predetermined for a set formed of a plurality of second public keys, and data obtained by converting at least one second public key belonging to said at least one subset is determinable between said data obtained by converting said first public key and said data obtained by converting said plurality of second public keys;

adding, at said transmitting side, said data value to said ciphertext;

determining, at a receiving side which possesses a secret key paired with said second public key, said data obtained by converting said plurality of second public keys, based from said secret key paired with said second public key; and determining, at said receiving side, said data obtained by converting said first public key and used as said parameter at the time of generation of said ciphertext by introducing said data value added to said ciphertext and data determined, into said relational expression used.

2. A key recovery method according to claim 1, wherein said data obtained by converting either said first or second public key is data obtained by operating a random number and the corresponding public key.

3. A key recovery system in which data obtained by converting a public key and used as a parameter at the time of generation of ciphertext in a data ciphering device is generated in a data deciphering device without using a secret key paired with the public key, wherein said data ciphering device comprises:

first generating means for generating a data value satisfying a relational expression by which data obtained by converting a first public key and used as the parameter at the time of generation of ciphertext can be determined, if at least one subset is predetermined for a set formed of a plurality of second public keys, and data obtained by converting at least one second public key belonging to said at least one subset is determinable between said data obtained by converting said first public key and said data obtained by converting said plurality of second public keys; and applying means for applying said data value to said ciphertext, and wherein said data deciphering device comprises:

acquiring means for acquiring said data obtained by converting said plurality of second public keys; and second generating means for determining said data obtained by converting said first public key and used as the parameter at the time of generation of said ciphertext by introducing, said data value applied to said ciphertext by said applying means and data acquired by said acquiring means, into said relational expression used in said first generating means.

4. A key recovery system according to claim 3, wherein said data obtained by converting said second public key is acquired by said acquiring means from at least one information processor which possesses a secret key paired with said second public key, and said data obtained by converting said second public key is determined by said information processor from a secret key paired with said second public key and provided by said information processor.

5. A key recovery system according to claim 3, wherein said data obtained by converting said second public key is acquired by said acquiring means from a secret key paired with said second public key and provided by said acquiring means.

6. A key recovery system according to claim 3, wherein said secret key paired with said second public key is held by a plurality of information processors in a plurality of parts resortable through a predetermined operation, and at least one of said plurality of information processors being provided with means for restoring said secret key by performing said predetermined operation for different parts of said secret key provided by said plurality of information processors and means for determining from a restored secret key said data obtained by converting said second public key, and said acquiring means acquiring said data obtained by converting said second public key and determined by said at least one information processor.

7. An information processor, comprising:

means for generating ciphertext using data obtained by converting a first public key; and means for generating a data value satisfying a relational expression by which said data obtained by converting said first public key and used as a parameter for generating said ciphertext can be determined, if at least one subset is predetermined for a set formed of a plurality of second public keys, and data obtained by converting at least one second public key belonging to said at least one subset is determinable between said data obtained by converting said first public key and said data obtained by converting said plurality of second public keys.

8. An information processor for recovering, data obtained by converting a first public key and used as a parameter at the time of generation of ciphertext, from a data value generated by said information processor according to claim 7, comprising:

acquiring means for acquiring said data obtained by converting said plurality of second public keys; and determining means for determining said data obtained by converting said first public key on the basis of said data value and said data acquired by said acquiring means.

9. A computer readable recording medium having a program for generation of ciphertext that, when executed by an information processor, causes said information processor to perform:

generating ciphertext using data obtained by converting a first public key;

generating a data value satisfying a relational expression by which said data obtained by converting said first public key can be determined, if at least one subset is predetermined for a set formed of a plurality of second public keys, and data obtained by converting at least one second public key belonging to said at least one subset is determinable between said data obtained by converting said first public key and said data obtained by converting said plurality of second public keys; and applying said data value to said ciphertext for transmission, via a network.

10. A computer readable recording medium according to claim 9, wherein said program causes said information processor to further perform:

determining data obtained by converting said second public key based on a secret key paired with said second public key;

determining data obtained by converting said first public key and used as a parameter at the time of generation of said ciphertext by introducing, said data value applied to said ciphertext and said data determined and obtained by converting said second public key, into said relational expression used for generation of said data value; and deciphering said ciphertext using said data determined and obtained by converting said first public key.

11. A key recovery method of recovering data used as a parameter for generating ciphertext, said method comprising:

generating, at a transmitting side, data to be used as a parameter to generate said ciphertext, on the basis of data obtained by converting at least one first public key and data obtained by converting at least one second public key;

generating, at said transmitting side, said ciphertext using data generated as said parameter, generating, at said transmitting side, a data value satisfying a relational expression by which if at least one subset is predetermined for a set formed of a plurality of second public keys, and one of said data obtained by converting said at least one first public key and said data obtained by converting said at least one second public key belonging to said at least one subset is determinable, the other data thereof can be determined therefrom directly or indirectly; and applying, at said transmitting side, said data value to said ciphertext;

determining, at a receiving side which possesses a secret key paired with said second public key, data obtained by converting said at least one second public based on said secret key paired with said second public key;

determining, at said receiving side, data obtained by converting said at least one first public key, by introducing said data value applied to said ciphertext and said data determined and obtained by converting said at least one second public key, into said relational expression used; and determining data used as said parameter to generate said ciphertext, on the basis of said data determined and obtained by converting said at least one first public key and said data determined and obtained by converting said at least one second public key.

12. A key recovery method according to claim 11, wherein said data obtained by converting either said at least one first public key or said at least one second public key corresponds to data obtained by operating a random number and a corresponding public key.

13. A key recovery system in which data used as a parameter at the time of generation of ciphertext by a data ciphering device is recovered by a data deciphering device, wherein said data ciphering device comprises:

first generating means for generating data to be used as a parameter at the time of generation of ciphertext on the basis of data obtained by converting at least one first public key and data obtained by converting at least one second public key;

ciphering means for generating said ciphertext using as a parameter said data generated by said first generating means;

second generating means for generating a data value satisfying a relational expression by which, if at least one subset is predetermined for a set formed of a plurality of second public keys, one of said data obtained by converting said at least one first public key and said data obtained by converting said at least one second public key belonging to said at least one subset is determinable, the other data thereof can be determined therefrom directly or indirectly; and applying means for applying said data value generated by said second generating means to said ciphertext generated in said ciphering means, and wherein said data deciphering means comprises:

first determining means for determining said data obtained by converting said at least one second public key based on a secret key paired with said second public key;

second determining means for determining said data obtained by converting said at least one first public key by introducing, said data value applied by said applying means to said ciphertext generated by said ciphering means and said data determined by said first determining means, into said relational expression used in said second generating means;

third determining means for determining data generated by said second generating means and used as a parameter at the time of generation of ciphertext, on the basis of data obtained by converting said at least one first public key and determined by said second determining means and data obtained by converting said at least one second public key and determined by said first determining means; and deciphering means for deciphering said ciphertext using as a parameter said data determined by said third determining means.

14. An information processor for generating ciphertext, comprising:

first generating means for generating data to be used as a parameter at the time of generation of ciphertext on the basis of data obtained by converting at least one first public key and data obtained by converting at least one second public key;

ciphering means for generating said ciphertext using as a parameter said data generated by said first generating means;

second generating means for generating a data value satisfying a relational expression by which, if at least one subset is predetermined for a set formed of a plurality of second public keys, one of said data obtained by converting said at least one first public key and said data obtained by converting said at least one second public key belonging to said at least one subset is determinable, the other data thereof can be determined therefrom directly or indirectly; and applying means for applying said data value to said ciphertext.

15. An information processor according to claim 14, further comprising:

first determining means for determining said data obtained by converting said at least one second public key, based on a secret key paired with said second public key;

second determining means for determining said data obtained by converting said at least one first public key, by introducing, said data value applied to said ciphertext and said data determined by said first determining means, into said relational expression used in said second generating means;

third determining means for determining data generated by said second generating means and used as a parameter at the time of generation of ciphertext by said ciphering means, on the basis of said data obtained by converting said at least one first public key and determined by said second determining means and said data obtained by converting said at least one second public key and determined by said first determining means; and deciphering means for using as a parameter said data determined by said third determining means to decipher said ciphertext generated by said ciphering means.

16. A computer readable recording medium having a program for generation of ciphertext that, when executed by an information processor, causes said information processor to perform:

generating key data to be used as a parameter at the time of generation of ciphertext on the basis of data obtained by converting at least one first public key and data obtained by converting at least one second public key;

generating said ciphertext using said key data;

generating a data value satisfying a relational expression by which, if at least one subset is predetermined for a set formed of a plurality of public keys, one of said data obtained by converting said at least one first public key and said data obtained by converting said at least one second public key belonging to said at least one subset is determinable, the other data thereof can be determined therefrom directly or indirectly; and applying, said data value to said ciphertext.

17. A computer readable recording medium according to claim 16, wherein said program causes said information processor to further perform:

determining said data obtained by converting said at least one second public key, based on a secret key paired with said second public key;

determining said data obtained by converting said at least one first public key, by introducing, said data value applied to said ciphertext and said data determined and obtained by converting said at least one second public key, into said relational expression used for generation of said data value, determining key data used as a parameter at the time of generation of ciphertext on the basis of said data determined and obtained by converting said at least one first public key and said data determined and obtained by converting said at least one second public key; and deciphering said ciphertext using said key data determined.

18. A computer readable recording medium for storing a program to perform key recovery with which data obtained by converting a public key and used as a parameter at the time of generation of ciphertext is generated, which when executed by a computer without a secret key paired with said public key at a receiving side, causes said computer to perform:

receiving, at a transmitting side, ciphertext applied with a data value generated to satisfy a relational expression by which data obtained by converting a first public key and used as a parameter at the time of generation of ciphertext can be determined, if at least one subset is predetermined for a set formed of a plurality of second public keys, and data obtained by converting at least one second public key belonging to said at least one subset is determinable between said data obtained by converting said first public key and said data obtained by converting said plurality of second public keys;

receiving, at a receiving side, and determining, said data obtained by converting said plurality of second public keys from a secret key paired with said second public key; and determining said data obtained by converting said first public key and used as the parameter at the time of generation of said ciphertext, by introducing said data value applied to received ciphertext and data determined into said relational expression.

19. A computer readable recording medium for storing a program to perform key recovery with which data obtained by converting a public key and used as a parameter at the time of generation of ciphertext is generated, which, when executed by a computer at a receiving side without a secret key paired with said public key, causes said computer to perform:

receiving from the transmitting side ciphertext having a data structure in which said ciphertext generated using, as a ciphertext generating parameter, data generated on the basis of data obtained by converting at least one first public key and data obtained by converting at least one second public key equal in number to said at least one first public key is applied with a data value generated to satisfy a relational expression by which if one of said data obtained by converting said at least one first public key and said data obtained by converting said at least one second public key is decided, the other data thereof can be determined directly or indirectly;

determining said data obtained by converting said at least one second public key, based on said secret key paired with said second public key and possessed at the receiving side;

determining said data obtained by converting said at least one first public key, by introducing, said data value applied to said ciphertext and said data determined from said secret key paired with said second public key, into said relational expression; and determining data used as said ciphertext generating parameter at the time of generation of said ciphertext, on the basis of said data obtained by converting said at least one first public key and said data obtained by converting said at least one second public key.

* * * * *